United States Patent
Chen et al.

(10) Patent No.: US 12,401,028 B2
(45) Date of Patent: Aug. 26, 2025

(54) SECONDARY BATTERY, BATTERY MODULE, BATTERY PACK, AND ELECTRIC DEVICE

(71) Applicant: CONTEMPORARY AMPEREX TECHNOLOGY (HONG KONG) LIMITED, Hong Kong (CN)

(72) Inventors: Peipei Chen, Ningde (CN); Limei Zhang, Ningde (CN); Jiao Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 43 days.

(21) Appl. No.: 18/608,943

(22) Filed: Mar. 19, 2024

(65) Prior Publication Data

US 2024/0234709 A1    Jul. 11, 2024

Related U.S. Application Data

(63) Continuation of application No. PCT/CN2022/084897, filed on Apr. 1, 2022.

(51) Int. Cl.
| | |
|---|---|
| *H01M 4/505* | (2010.01) |
| *H01M 4/36* | (2006.01) |
| *H01M 4/58* | (2010.01) |
| *H01M 10/0567* | (2010.01) |
| *H01M 10/0568* | (2010.01) |
| *H01M 10/0569* | (2010.01) |
| *H01M 4/02* | (2006.01) |

(52) U.S. Cl.
CPC ........... *H01M 4/505* (2013.01); *H01M 4/366* (2013.01); *H01M 4/5825* (2013.01); *H01M 10/0567* (2013.01); *H01M 10/0568* (2013.01); *H01M 10/0569* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

2021/0005928 A1   1/2021   Lassagne et al.

FOREIGN PATENT DOCUMENTS

| | | |
|---|---|---|
| CN | 102842713 A | 12/2012 |
| CN | 103069624 A | 4/2013 |
| CN | 104577115 A | 4/2015 |
| CN | 108987680 A | 12/2018 |
| CN | 109301174 A | 2/2019 |
| CN | 109638262 A | 4/2019 |
| CN | 110416525 A | 11/2019 |
| CN | 112420998 A | 2/2021 |
| CN | 114256448 A | 3/2022 |
| JP | 2008130525 A | 6/2008 |
| JP | 2011014379 A | 1/2011 |
| JP | 2012182130 A | 9/2012 |
| JP | 5268042 B2 | 8/2013 |
| JP | 2014056722 A | 3/2014 |
| JP | 2015144104 A | 8/2015 |
| JP | 2020533762 A | 11/2020 |
| WO | 2012002327 A1 | 1/2012 |
| WO | 2018032569 A1 | 2/2018 |
| WO | 2018222348 A1 | 12/2018 |
| WO | 2019151724 A1 | 8/2019 |
| WO | 2021023131 A1 | 2/2021 |
| WO | 2021128002 A1 | 7/2021 |

OTHER PUBLICATIONS

International Search Report received in the corresponding International Application PCT/CN2022/084897, mailed Jan. 4, 2023.
The first office action received in the counterpart Chinese Application 202280011993.5, mailed on Apr. 16, 2024.
Grant notice received in the counterpart Chinese Application 202280011993.5, mailed on Jun. 3, 2024.
Notice of reasons for refusal received in the counterpart Japanese Application 2023-548354, mailed on Oct. 28, 2024.
Extended European Search Report issued to related EP Application No. 22930127.0, dated Feb. 5, 2025, 11 pages.
Office Action issued to related JP Application No. 2023-548354, dated Mar. 4, 2025, 6 pages (with English translation).

*Primary Examiner* — Carlos Barcena
(74) *Attorney, Agent, or Firm* — K&L Gates LLP

(57) ABSTRACT

Provided are a secondary battery, a battery module, a battery pack, and an electric device. The secondary battery includes: a positive electrode sheet and a non-aqueous electrolyte, where the positive electrode sheet includes a cathode active material with a core-shell structure, and the cathode active material includes a core and a shell covering the core; the core has a chemical formula of $Li_{1+x}Mn_{1-y}A_yP_{1-z}R_zO_4$; where the first coating layer includes a crystalline pyrophosphate $Li_aMP_2O_7$ and/or a crystalline pyrophosphate $M_b(P_2O_7)_c$, the second coating layer includes a crystalline phosphate $XPO_4$, and the third coating layer is carbon; and the non-aqueous electrolyte includes a first lithium salt and a first additive, where the first lithium salt includes one or more selected from the group consisting of LiN$(C_mF_{2m+1}SO_2)(C_nF_{2n+1}SO_2)$ and Li(FSO$_2)_2$N, where m and n each are a positive integer.

22 Claims, 2 Drawing Sheets

SECONDARY BATTERY, BATTERY MODULE, BATTERY PACK, AND ELECTRIC DEVICE

CROSS REFERENCE TO RELATED MATTER

This application is a continuation of international application PCT/CN2022/084897, filed Apr. 1, 2022 and entitled "SECONDARY BATTERY, BATTERY MODULE, BATTERY PACK, AND ELECTRIC DEVICE", the entire content of which is hereby incorporated by reference in its entirety.

TECHNICAL FIELD

The present application relates to the technical field of lithium batteries, and in particular to a secondary battery, a battery module, a battery pack, and an electric device.

BACKGROUND

In recent years, with the increasingly-extensive application of lithium-ion batteries (LIBs), LIBs are widely used in energy-storage power systems such as hydroelectric, thermal, wind, and solar power stations and in fields such as electric tools, electric bicycles, electric motorcycles, electric vehicles, military equipment, and aerospace. With the vigorous development of LIBs, advanced requirements have been put forward for properties such as energy density, cycling performance, and safety performance of LIBs.

Lithium manganese phosphate (LMP) cathode active materials have higher safety and a longer cycling life than other cathode active materials, but LMP has poor rate performance, which is usually solved by coating or doping at present. However, it is still hoped that the rate performance, cycling performance, and high-temperature stability of LMP cathode active materials can be further improved.

SUMMARY

The present application is implemented in view of the above topic. An objective of the present application is to provide a secondary battery, a battery module, a battery pack, and an electric device, such as to solve the problem that an LMP secondary battery has poor cycling performance.

In order to achieve the above objective, a first aspect of the present application provides a secondary battery, including: a positive electrode sheet and a non-aqueous electrolyte, where the positive electrode sheet includes a cathode active material with a core-shell structure, and the cathode active material includes a core and a shell covering the core; the core has a chemical formula of $Li_{1+x}Mn_{1-y}A_yP_{1-z}R_zO_4$, where x is any value in a range of −0.100 to 0.100, y is any value in a range of 0.001 to 0.500, and z is any value in a range of 0.001 to 0.100; A is one or more selected from the group consisting of Zn, Al, Na, K, Mg, Mo, W, Ti, V, Zr, Fe, Ni, Co, Ga, Sn, Sb, Nb, and Ge, and is optionally one or more selected from the group consisting of Fe, Ti, V, Ni, Co, and Mg; R is one or more selected from the group consisting of B, Si, N, and S, and is optionally one selected from the group consisting of B, Si, N, and S; and values of x, y, and z meet the following condition: keeping the entire core electrically neutral; the shell includes a first coating layer covering the core, a second coating layer covering the first coating layer, and a third coating layer covering the second coating layer, where the first coating layer includes a crystalline pyrophosphate $Li_aMP_2O_7$ and/or a crystalline pyrophosphate $M_b(P_2O_7)_c$, where 0≤a≤2, 1≤b≤4, and 1≤c≤6; values of a, b, and c meet the following condition: keeping the crystalline pyrophosphate $Li_aMP_2O_7$ or $M_b(P_2O_7)_c$ electrically neutral; and M in each of the crystalline pyrophosphates $Li_aMP_2O_7$ and $M_b(P_2O_7)_c$ is independently one or more selected from the group consisting of Fe, Ni, Mg, Co, Cu, Zn, Ti, Ag, Zr, Nb, and Al; the second coating layer includes a crystalline phosphate $XPO_4$, where X is one or more selected from the group consisting of Li, Fe, Ni, Mg, Co, Cu, Zn, Ti, Ag, Zr, Nb, and Al; and the third coating layer is carbon; and the non-aqueous electrolyte includes a first lithium salt and a first additive, where the first lithium salt includes one or more selected from the group consisting of $LiN(C_mF_{2m+1}SO_2)(C_nF_{2n+1}SO_2)$ and $Li(FSO_2)_2N$, where m and n each are a positive integer; and the first additive includes one or more selected from the group consisting of compounds shown in Formula 1,

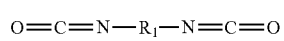

Formula 1 where $R_1$ is any one selected from the group consisting of $C_2$-$C_{10}$ alkylene, $C_2$-$C_{10}$ heteroalkylene, $C_6$-$C_{18}$ arylene, $C_2$-$C_{18}$ heteroarylene, $C_3$-$C_{18}$ alicyclylene, and $C_3$-$C_{18}$ heteroalicyclylene that each are or are not substituted by one or more $R_a$ groups; $R_a$ includes one or more selected from the group consisting of a halogen atom, —CN, —NCO, —OH, —COOH, —SOOH, —COOR$_b$, $C_2$-$C_{10}$ alkyl, $C_2$-$C_{10}$ alkenyl, $C_2$-$C_{10}$ alkynyl, and $C_2$-$C_{10}$ oxaalkyl; and $R_b$ is any $C_1$-$C_{10}$ alkyl.

In the present application, the "crystalline" means that a crystallinity is 50% or more, namely, 50% to 100%. A crystallinity of less than 50% corresponds to a glassy state. The crystalline pyrophosphate and crystalline phosphate in the present application each have a crystallinity of 50% to 100%. The pyrophosphate and phosphate with a specified crystallinity can give full play to an ability of the pyrophosphate coating layer to hinder the dissolution of manganese ions, the excellent lithium ion conduction of the phosphate coating layer, and the reduction of interfacial side reactions, and can also facilitate well lattice matching between the pyrophosphate coating layer and the phosphate coating layer to allow tight bonding between the two coating layer.

In the present application, a new LMP cathode active material with a core-shell structure is provided by doping an element A at a manganese position and an element R at a phosphorus position of LMP to obtain a doped LMP core and coating a surface of the doped LMP core with three coating layers sequentially; and when used in a secondary battery, the cathode active material can significantly improve the high-temperature cycling performance, cycling stability, and high-temperature storage performance of the secondary battery.

In addition, in the non-aqueous electrolyte, the first lithium salt is adopted as a main lithium salt, and due to excellent thermal stability and hydrolysis resistance, the first lithium salt can effectively reduce an acidity of the electrolyte, reduce the dissolution of manganese ions, and improve the high-temperature cycling and storage performance. An isocyanate-based compound shown in Formula 1 is introduced into the non-aqueous electrolyte, and the isocyanate-based compound can react with trace water in a battery to produce —NHCOOH and thus can prevent the trace water from reacting with the non-aqueous electrolyte to produce HF, which can further reduce the acidity of the electrolyte and the dissolution of manganese ions, thereby improving the high-temperature cycling and storage performance. In addition, the isocyanate-based compound shown in Formula 1 can also form a uniform solid electrolyte interphase (SEI) film at a negative electrode, which can reduce the reduction of dissolved Mn at the negative electrode to further improve the high-temperature cycling and storage performance.

In some embodiments, $R_1$ is any one selected from the group consisting of $C_2$-$C_{10}$ alkylene, $C_2$-$C_{10}$ oxaalkylene, $C_2$-$C_{10}$ azaalkylene, phenylene, naphthylene, anthracenylene, cyclobutylene, cyclopentylene, cyclohexylene, biphenylene, and methylenediphenylene that each are or are not substituted by one or more $R_a$ groups, and optionally, $R_1$ is any one selected from the group consisting of $C_2$-$C_6$ alkylene, phenylene, naphthylene, anthracenylene, cyclobutylene, cyclopentylene, cyclohexylene, biphenylene, and methylenediphenylene that each are or are not substituted by one or more $R_a$ groups; and/or $R_a$ includes one or more selected from the group consisting of a halogen atom, —CN, and $C_2$-$C_3$ alkyl; and/or there is 0, 1, 2, 3, or 4 $R_a$ groups in a compound shown in Formula 1.

Optionally, the first additive includes one or more selected from the group consisting of the following compounds:

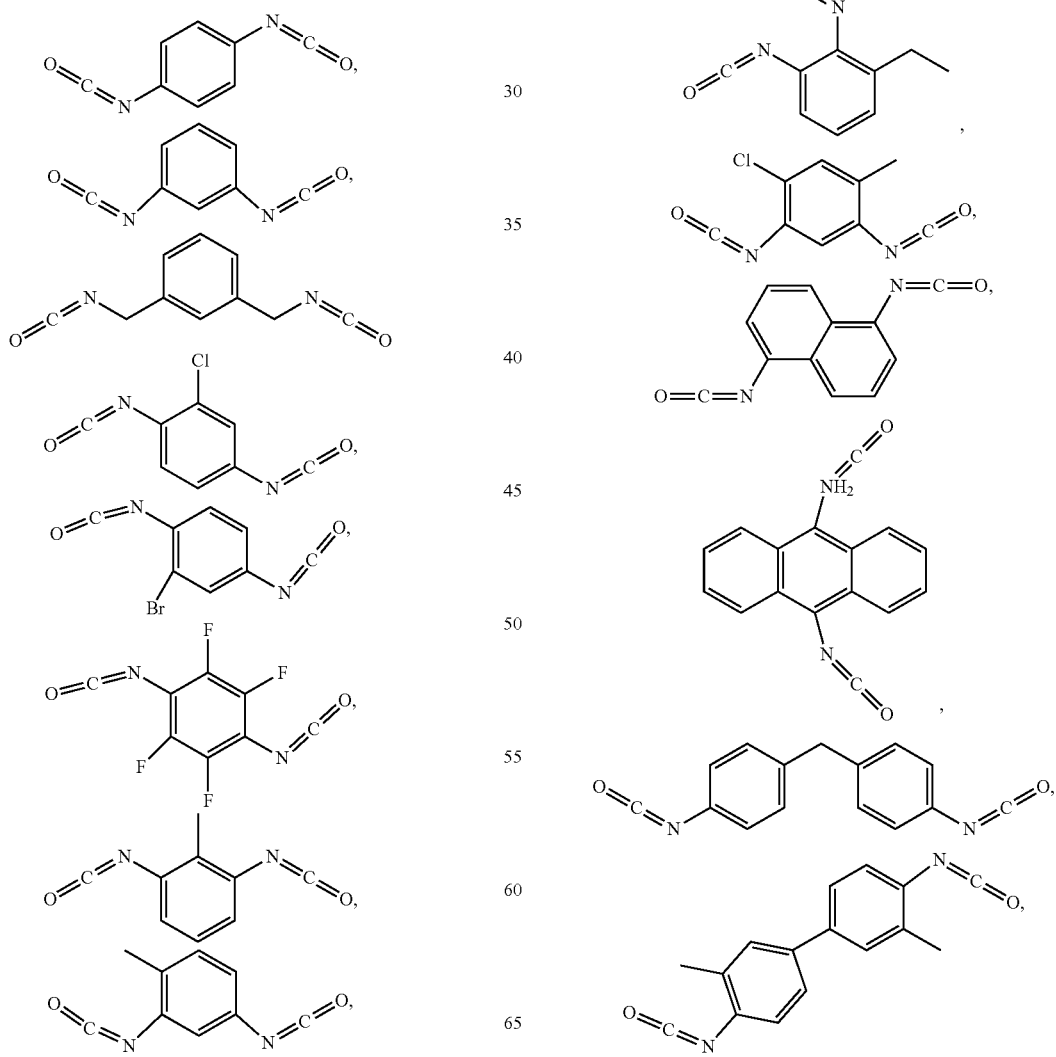

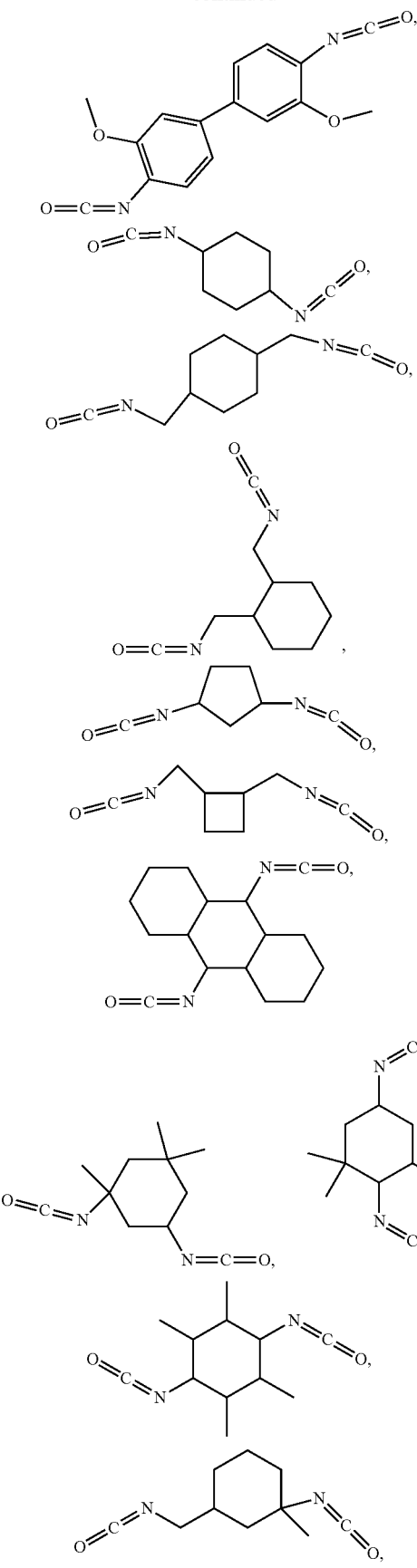

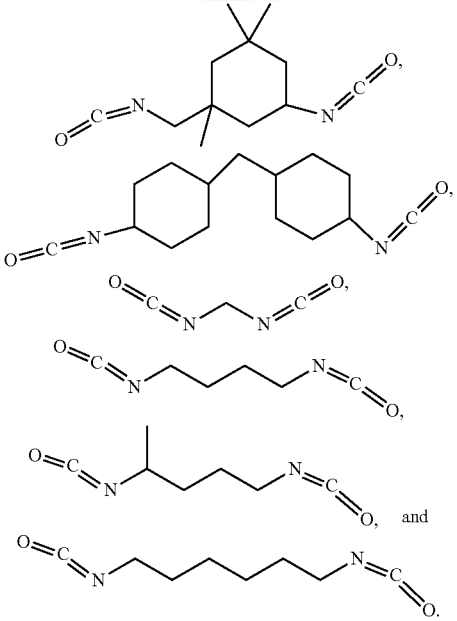

$LiN(C_mF_{2m+1}SO_2)(C_nF_{2n+1}SO_2)$ in the first lithium salt may be selected from the group consisting of any corresponding specific compounds in the prior art, where in some embodiments, m and n each are independently selected from the group consisting of 0, 1, 2, and 3, so as to provide more excellent thermal stability.

In some embodiments of the present application, when the first lithium salt is any one selected from the group consisting of $LiN(CF_3SO_2)(FSO_2)$, $LiN(CF_3SO_2)(C_2F_5SO_2)$, and $LiN(C_3F_7SO_2)(CF_3SO_2)$, the first additive is any one selected from the group consisting of the following compounds:

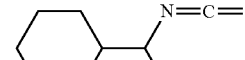

In this case, the first lithium salt and the first additive can give full play to their respective advantages, and can reduce the acidity of the electrolyte, reduce the dissolution of manganese ions, and avoid the deterioration of impedance of a negative electrode, thereby improving the high-temperature cycling and storage performance of an LIB without affecting the capacity and rate performance of the LIB.

In some embodiments, based on a total weight of the non-aqueous electrolyte, a content of the first lithium salt is set as W1 wt %, and W1 is 0.1 to 48 (such as 0.1, 0.5, 1, 2, 3, 4, 5, 7, 10, 12, 14, 15, 16, 18, 20, 22, 25, 28, 30, 40, 45, or 48) and optionally 5 to 20, which can alleviate the corrosion of an aluminum foil caused by the first lithium salt under a high working voltage.

In some embodiments, a content of the first additive is set as W2 wt %, and W2 is 0.01 to 20 (such as 0.01, 0.05, 0.1, 0.2, 0.3, 0.4, 0.5, 1, 2, 3, 4, 5, 8, 10, 12, 15, 18, or 20) and optionally 0.1 to 10 or 0.3 to 5. When a mass proportion of the first additive in the electrolyte is in the above range, it can reduce the acidity of the electrolyte, reduce the dissolution of manganese ions, and avoid the deterioration of impedance of a negative electrode, thereby improving the high-temperature cycling and storage performance of an LIB without affecting the capacity and rate performance of the LIB.

In some embodiments, W1/W2 is defined as M, and M is 0.001 to 3 (such as 0.001, 0.002, 0.005, 0.007, 0.1, 0.2, 0.3, 0.4, 0.5, 1, 2, or 3) and optionally 0.005 to 0.5. When W1/W2 is within the above range, the first lithium salt and the first additive can play an excellent synergistic role to ensure low acidity of a system, reduced dissolution of manganese ions, and excellent high-temperature cycling and storage performance of an LIB.

In some embodiments, on the basis of controlling the content of the first lithium salt, a second lithium salt can be added to supplement a lithium salt in the non-aqueous electrolyte, that is, the non-aqueous electrolyte further includes a second lithium salt, and the second lithium salt includes one or more selected from the group consisting of lithium difluorophosphate (LiDFP), lithium difluoro(bisoxalato)phosphate (LiDFBOP), lithium difluoro(oxalato)borate (LIODFB), lithium bis(oxalato)borate (LiBOB), $LiPF_6$, $LiBF_4$, and $LiAsF_6$. The second lithium salt added as a lithium salt-type additive to the non-aqueous electrolyte will preferentially be decomposed on a surface of an aluminum foil, and a decomposition product will combine with aluminum ions to produce a nonsoluble or insoluble precipitate adhered to the surface of the aluminum foil to form a passivation film, which can prevent direct contact between the aluminum foil and the electrolyte to protect the aluminum foil and thus cooperates with the first lithium salt to improve the high-temperature cycling and storage performance.

In some embodiments, based on a total weight of the non-aqueous electrolyte, a content of the second lithium salt is set as W3 wt %, and W3 is 0.01 to 20 (such as 0.01, 0.02, 0.05, 0.08, 0.1, 0.2, 0.3, 0.5, 0.8, 1, 2, 3, 4, 5, 6, 7, 8, 9, 10, 15, or 20) and optionally 0.1 to 10 or 0.3 to 5. When a mass proportion of the second lithium salt in the electrolyte is in the above range, it can inhibit the corrosion of an aluminum foil and improve the high-temperature cycling and storage performance of an LIB without deteriorating the capacity and rate performance of the LIB.

In some embodiments, (W2+W3)/W1 is defined as N, and N is 0.01 to 5 (such as 0.01, 0.02, 0.05, 0.08, 0.1, 0.5, 0.8, 1.0, 2, 3, 4, or 5) and optionally 0.02 to 1. When W1/W2 and (W2+W3)/W1 are within the above respective ranges, the first lithium salt, the first additive, and the second lithium salt can play an excellent synergistic role to ensure low acidity of a system, reduced dissolution of manganese ions, and excellent high-temperature cycling and storage performance of an LIB, and can also effectively inhibit the corrosion of an aluminum foil and improve the high-temperature cycling and storage performance of an LIB without deteriorating the capacity and rate performance of the LIB.

In some embodiments, the non-aqueous electrolyte further includes a second additive, and the second additive includes one or more selected from the group consisting of an unsaturated bond-containing cyclic carbonate compound, a halogen-substituted saturated cyclic carbonate compound, a sulfate compound, a sulfite compound, a sultone compound, a disulfonic acid compound, a nitrile compound, an aromatic compound, a phosphonitrile compound, a cyclic anhydride compound, a phosphite compound, a phosphate compound, and a borate compound. Those skilled in the art may select a corresponding second additive from the group consisting of the above compounds according to actual needs, and a content of the second additive in the non-aqueous electrolyte may also be determined with reference to the prior art, which will not be repeated here.

In some embodiments, the non-aqueous electrolyte further includes an organic solvent, and a type of the organic solvent is not particularly limited and can be determined according to actual needs. Specifically, the organic solvent includes one or more selected from the group consisting of a cyclic carbonate compound, a chain carbonate compound, and a carboxylate compound, and optionally, the organic solvent includes one or more selected from the group consisting of dimethyl carbonate (DMC), diethyl carbonate (DEC), dipropyl carbonate (DPC), ethyl methyl carbonate (EMC), methyl propyl carbonate (MPC), ethyl propyl carbonate (EPC), ethylene carbonate (EC), propylene carbonate (PC), butylene carbonate (BC), γ-butyrolactone, methyl formate, ethyl formate, methyl acetate, ethyl acetate, propyl acetate, methyl propionate, ethyl propionate, butyl propionate, and tetrahydrofuran (THF).

In some embodiments, based on a weight of the core, a coating amount of the first coating layer is set as C1 wt %, and C1 is greater than 0 and less than or equal to 6, optionally greater than 0 and less than or equal to 5.5, and more optionally greater than 0 and less than or equal to 2; and/or based on the weight of the core, a coating amount of the second coating layer is set as C2 wt %, and C2 is greater than 0 and less than or equal to 6, optionally greater than 0 and less than or equal to 5.5, and more optionally 2 to 4; and/or based on the weight of the core, a coating amount of the third coating layer is set as C3 wt %, and C3 is greater than 0 and less than or equal to 6, optionally greater than 0 and less than or equal to 5.5, and more optionally greater than 0 and less than or equal to 2.

In the cathode active material with the core-shell structure in the above embodiment, the coating amounts of the three coating layers are preferably in the above ranges, respectively, such that the core can be fully coated, and the kinetic performance and safety performance of the secondary battery can be further improved without sacrificing a capacity per gram of the cathode active material.

In some embodiments, based on a weight of the core, a coating amount of the first coating layer is set as C1 wt %, and C1 is greater than 0 and less than or equal to 6, optionally greater than 0 and less than or equal to 5.5, and more optionally greater than 0 and less than or equal to 2; and/or based on the weight of the core, a coating amount of the second coating layer is set as C2 wt %, and C2 is greater than 0 and less than or equal to 6, optionally greater than 0 and less than or equal to 5.5, and more optionally 2 to 4; and/or based on the weight of the core, a coating amount of the third coating layer is set as C3 wt %, and C3 is greater than 0 and less than or equal to 6, optionally greater than 0 and less than or equal to 5.5, and more optionally greater than 0 and less than or equal to 2; and a ratio of (W1+W2)/(C1+C2+C3) is defined as Q, and Q is 0.1 to 10 and optionally 0.5 to 5. If the Q value is smaller than the above range, the lithium salt and the additive are not enough to reduce the acidity of the electrolyte, cannot fully and completely inhibit the dissolution of manganese ions, and can only lead to insufficient improvement for the high-temperature cycling and storage performance. If the Q value is larger than the above range, the film-forming impedance is too large, which affects the improvement of the capacity and rate performance of an LIB.

In any embodiment, for the crystalline pyrophosphate in the first coating layer, an interplanar crystal spacing is in a range of 0.293 nm to 0.470 nm and an angle of a crystal orientation (111) is in a range of 18.00° to 32.00°; and for the crystalline phosphate in the second coating layer, an interplanar crystal spacing is in a range of 0.244 nm to 0.425 nm and an angle of a crystal orientation (111) is in a range of 20.00° to 37.00°. The first and second coating layers in the cathode active material of the above embodiment both adopt a crystalline substance. When the interplanar crystal spacing and angle for each of the crystalline substances of the two coating layers are within the above respective ranges, the coating layers can be effectively prevented from including an impurity phase, thereby improving the capacity per gram, cycling performance, and rate performance of the material.

In any embodiment, in the core, a ratio of y to 1−y is 1:10 to 1:1 and optionally 1:4 to 1:1, which can further improve the cycling performance and rate performance of the secondary battery.

In any embodiment, in the core, a ratio of z to 1−z is 1:999 to 1:9 and optionally 1:499 to 1:249, which can further improve the cycling performance and rate performance of the secondary battery.

In any embodiment, the carbon of the third coating layer is a mixture of SP2-hybridized carbon and SP3-hybridized carbon, and optionally, a molar ratio of the SP2-hybridized carbon to the SP3-hybridized carbon is any value in a range of 0.1 to 10 and is optionally any value in a range of 2.0 to 3.0. In the above embodiment, the molar ratio of the SP2-hybridized carbon to the SP3-hybridized carbon is controlled in the above range to improve the comprehensive performance of the secondary battery.

In any embodiment, the first coating layer has a thickness of 1 nm to 10 nm; and/or the second coating layer has a thickness of 2 nm to 15 nm; and/or the third coating layer has a thickness of 2 nm to 25 nm.

In the above embodiment, when the thickness of the first coating layer is in a range of 1 nm to 10 nm, it can avoid the problems that a too-large thickness may have an adverse effect on the kinetic performance of the material and a too-small thickness cannot effectively hinder the migration of transition metal ions. When the thickness of the second coating layer is in a range of 2 nm to 15 nm, the second coating layer has a stable surface structure undergoing few side reactions with an electrolyte, and thus can effectively reduce interfacial side reactions, thereby improving the high-temperature performance of the secondary battery. When the thickness of the third coating layer is in a range of 2 nm to 20 nm, the electric conductivity of the material and the compacted density performance of a battery electrode sheet prepared with the cathode active material can be improved.

In any embodiment, based on a weight of the cathode active material with the core-shell structure, a manganese content is in a range of 10 wt % to 35 wt %, optionally in a range of 15 wt % to 30 wt %, and more optionally in a range of 17 wt % to 20 wt %; a phosphorus content is in a range of 12 wt % to 25 wt % and optionally in a range of 15 wt % to 20 wt %; and a weight ratio of manganese to phosphorus is in a range of 0.90 to 1.25 and optionally in a range of 0.95 to 1.20.

In the cathode active material with the core-shell structure in the above embodiment, the control of the manganese content in the above range can effectively avoid the problem that a too-high manganese content may lead to deteriorated structural stability and decreased density of the material, thereby improving the cycling, storage, and compacted density performance of the secondary battery; and the control of the manganese content in the above range can also avoid the problem that a too-low manganese content may lead to low voltage plateau, thereby improving an energy density of the secondary battery.

In the cathode active material with the core-shell structure in the above embodiment, the control of the phosphorus content in the above range can effectively avoid the following problems: a too-high phosphorus content may cause the too-strong covalence of P—O to affect the electric conduction of small polarons, thereby affecting the electric conductivity of the material; and a too-low phosphorus content may reduce the stability of the core and the lattice structures of the pyrophosphate in the first coating layer and/or the phosphate in the second coating layer, thereby affecting the overall stability of the material.

In the cathode active material with the core-shell structure in the above embodiment, the control of the weight ratio of manganese to phosphorus in the above range can effectively avoid the following problems: a too-large weight ratio may increase the dissolution of transition metals, thereby affecting the stability of the material and the cycling and storage performance of the secondary battery; and a too-small weight ratio may decrease a discharge voltage plateau of the material, thereby reducing the energy density of the secondary battery.

In any embodiment, a lattice change rate of the cathode active material with the core-shell structure before and after complete lithium deintercalation is 4% or less, optionally 3.8% or less, and more optionally 2.0% to 3.8%. The cathode active material with the core-shell structure in the above embodiment can allow a lattice change rate of 4% or less before and after lithium deintercalation. Therefore, the use of the cathode active material can improve the capacity per gram and rate performance of the secondary battery.

In any embodiment, a Li/Mn antisite defect concentration of the cathode active material with the core-shell structure is 4% or less, optionally 2.2% or less, and more optionally 1.5% to 2.2%. The control of the Li/Mn antisite defect concentration in the above range can prevent $Mn^{2+}$ from hindering the transport of $Li^+$, and further improve the capacity per gram and rate performance of the cathode active material.

In any embodiment, a compacted density of the cathode active material with the core-shell structure at 3 T (ton) is 2.2 $g/cm^3$ or more and is optionally more than or equal to 2.2 $g/cm^3$ and less than or equal to 2.8 $g/cm^3$. The increased compacted density means that a weight of the active material per unit volume increases, which is conducive to improvement of a volumetric energy density of the secondary battery.

In any embodiment, a surface oxygen valence state of the cathode active material with the core-shell structure is −1.90 or less and is optionally −1.90 to −1.98. The control of the surface oxygen valence state of the cathode active material in the above range can further reduce the interfacial side reactions between the cathode material and the electrolyte, thereby improving the cycling performance and gas production performance during high-temperature storage of a battery cell.

A second aspect of the present application also provides a battery module including the secondary battery described in any embodiment of the present application.

A third aspect of the present application also provides a battery pack including the battery module of the present application.

A fourth aspect of the present application also provides an electric device including at least one selected from the group consisting of the secondary battery, the battery module, and the battery pack provided in the present application.

The secondary battery, battery module, and battery pack of the present application have high cycling performance and rate performance and especially have significantly-improved high-temperature stability, and thus the electric device including the secondary battery, battery module, or battery pack of the present application has high power cycling stability and high-temperature operation stability.

REFERENCE NUMERALS

Figure 1:
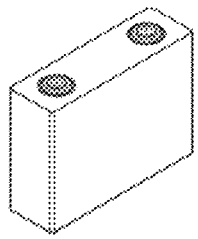
FIG. 1 is a schematic diagram of a secondary battery in an embodiment of the present application.

1: battery pack; 2: upper case; 3: lower case; 4: battery module; 5: secondary battery; 51: housing; 52: electrode assembly; and 53: top cover assembly

DETAILED DESCRIPTION

Embodiments specifically disclosing the secondary battery, battery module, battery pack, and electric device of the present application are described in detail below with appropriate reference to the accompanying drawings, but there will be a case where unnecessary details are omitted. For example, there are cases where detailed descriptions of well-known matters are omitted and repeated descriptions of actually the same structures are omitted. Thus, the following description does not become unnecessarily lengthy, which facilitates the easy comprehension of those skilled in the art. Further, the accompanying drawings and the following descriptions are provided to allow those skilled in the art to fully understand the present application and are not intended to define the subject matter stated in the claims.

The "range" disclosed in the present application is defined in the forms of lower and upper limits. A given range is defined by selecting a lower limit and an upper limit, and the selected lower and upper limits define a boundary of the range. Ranges defined in this manner may include or may not include an end value, and can be arbitrarily combined, that is, any lower limit can be combined with any upper limit to form a range. For example, if a range of 60 to 120 and a range of 80 to 110 are listed for a particular parameter, it should be understood that a range of 60 to 110 and a range of 80 to 120 are also expected. In addition, if lower limits of 1 and 2 and upper limits of 3, 4, and 5 are listed, the following ranges can all be expected: 1 to 3, 1 to 4, 1 to 5, 2 to 3, 2 to 4, and 2 to 5. In the present application, unless otherwise specified, a range of a to b is an abbreviated representation of any combination of real numbers between a and b, where a and b both are real numbers. For example, a range of 0 to 5 means that all real numbers between 0 and 5 have been listed herein, and 0 to 5 is merely an abbreviated representation of combinations of these values. In addition, when it is expressed that a parameter is an integer greater than or equal to 2, it means that the parameter is an integer such as 2, 3, 4, 5, 6, 7, 8, 9, 10, 11, or 12.

Unless otherwise specified, all embodiments of the present application and optional embodiments may be combined with each other to produce a new technical solution.

Unless otherwise specified, all technical features of the present application and optional technical features may be combined with each other to produce a new technical solution.

Unless otherwise specified, all steps of the present application may be conducted sequentially or randomly, and may preferably be conducted sequentially. For example, when it is expressed that a method includes steps (a) and (b), steps (a) and (b) may be conducted sequentially, or steps (b) and (a) may be conducted sequentially. For example, when it is expressed that the method may further include step (c), step (c) may be added to the method at any position, for example, the method may include steps (a), (b), and (c), or may include steps (a), (c), and (b), or may include steps (c), (a), and (b).

Unless otherwise specified, the "includes" and "comprises" in the present application may be open-ended or closed-ended terms. For example, the terms "includes" and "comprises" may mean that other components not listed may also be included or comprised, or only the listed components may be included or comprised.

Unless otherwise specified, the term "or" in the present application is inclusive. For example, the phrase "A or B" means "A, B, or both A and B." More specifically, the phrase "A or B" refers to any of the following conditions: A is true (or exists) and B is false (or does not exist); A is false (or does not exist) and B is true (or exists); or both A and B are true (or exist).

It should be noted that the term "coating layer" herein refers to a material layer covering an LMP core, and the material layer may completely or partially cover the LMP core; and the use of the term "coating layer" is only for ease of description, and is not intended to limit the present application. Similarly, the term "thickness of the coating layer" refers to a thickness of the material layer covering the LMP core in a radial direction of the LMP core.

The inventors of the present application have found in actual operations that the existing LMP cathode active materials currently undergo serious dissolution of manganese ions during a deep charge/discharge process. Although there are attempts to coat LMP with lithium iron phosphate (LFP) to reduce interfacial side reactions in the prior art, this coating manner cannot prevent the dissolved manganese from further migrating into an electrolyte. After migrating to a negative electrode, the dissolved manganese is reduced into a manganese metal. The manganese metal produced in this way is equivalent to a catalyst, which can catalyze the decomposition of an SEI film on a surface of the negative electrode to produce by-products. Some of the by-products are gases and cause expansion of the secondary battery, which affects the safety performance of the secondary battery; and some of the by-products are deposited on the surface of the negative electrode to block channels for lithium ions to enter and exit the negative electrode, which increases the impedance of the secondary battery, thereby affecting the kinetic performance of the secondary battery. In addition, in order to make up for the loss of the SEI film, the electrolyte and active lithium inside the battery are continuously consumed, which will bring an irreversible impact on a capacity retention of the secondary battery.

Through a large number of studies, the inventors have found that a novel cathode active material with a core-shell structure can be obtained by modifying LMP and coating the modified LMP with multiple coating layers; the cathode active material can significantly reduce the dissolution of manganese ions and reduce the lattice change rate; and when used in a secondary battery, the cathode active material can improve the cycling performance, rate performance, safety performance, and capacity of the secondary battery.

[Secondary Battery]

A secondary battery, also known as a rechargeable battery or an accumulator, refers to a battery that can be reused by activating an active material through charging after the battery is discharged.

Typically, a secondary battery includes a positive electrode sheet, a negative electrode sheet, a separator, and an electrolyte. During a charge/discharge process of the battery, active ions (such as lithium ions) are intercalated and deintercalated reciprocatedly between the positive and negative electrode sheets. The separator is arranged between the positive and negative electrode sheets, and the separator mainly plays a role of avoiding a short circuit of the positive and negative electrode sheets and can allow active ions to pass through. The electrolyte is arranged between the positive and negative electrode sheets, and mainly plays a role of conducting active ions.

An embodiment of the present application provides a secondary battery, including: a positive electrode sheet and a non-aqueous electrolyte, where the positive electrode sheet includes a cathode active material with a core-shell structure, and the cathode active material includes a core and a shell covering the core; the core has a chemical formula of $Li_{1+x}Mn_{1-y}A_yP_{1-z}R_zO_4$, where x is any value in a range of −0.100 to 0.100, y is any value in a range of 0.001 to 0.500, and z is any value in a range of 0.001 to 0.100; A is one or more selected from the group consisting of Zn, Al, Na, K, Mg, Mo, W, Ti, V, Zr, Fe, Ni, Co, Ga, Sn, Sb, Nb, and Ge, and is optionally one or more selected from the group consisting of Fe, Ti, V, Ni, Co, and Mg; R is one or more selected from the group consisting of B, Si, N, and S, and is optionally one selected from the group consisting of B, Si, N, and S; and values of x, y, and z meet the following condition: keeping the entire core electrically neutral; the shell includes a first coating layer covering the core, a second coating layer covering the first coating layer, and a third coating layer covering the second coating layer, where the first coating layer includes a crystalline pyrophosphate $Li_aMP_2O_7$ and/or a crystalline pyrophosphate $M_b(P_2O_7)_c$, where 0≤a≤2, 1≤b≤4, and 1≤c≤6; values of a, b, and c meet the following condition: keeping the crystalline pyrophosphate $Li_aMP_2O_7$ or $M_b(P_2O_7)_c$ electrically neutral; and M in each of the crystalline pyrophosphates $Li_aMP_2O_7$ and $M_b(P_2O_7)_c$ is independently one or more selected from the group consisting of Fe, Ni, Mg, Co, Cu, Zn, Ti, Ag, Zr, Nb, and Al; the second coating layer includes a crystalline phosphate $XPO_4$, where X is one or more selected from the group consisting of Li, Fe, Ni, Mg, Co, Cu, Zn, Ti, Ag, Zr, Nb, and Al; and the third coating layer is carbon; and the non-aqueous electrolyte includes a first lithium salt and a first additive, where the first lithium salt includes one or more selected from the group consisting of LiN$(C_mF_{2m+1}SO_2)(C_nF_{2n+1}SO_2)$ and Li$(FSO_2)_2$N, where m and n each are a positive integer; and the non-aqueous electrolyte includes a first lithium salt and a first additive, and optionally, the first lithium salt includes one or more selected from the group consisting of LiN$(C_mF_{2m+1}SO_2)(C_nF_{2n+1}SO_2)$ and Li$(FSO_2)_2$N, where m and n each are a positive integer; and the first additive includes one or more selected from the group consisting of compounds shown in Formula 1,

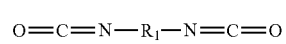

$$O{=}C{=}N{-}R_1{-}N{=}C{=}O \qquad \text{Formula 1}$$

where $R_1$ is any one selected from the group consisting of $C_2$-$C_{10}$ alkylene, $C_2$-$C_{10}$ heteroalkylene, $C_6$-$C_{18}$ arylene, $C_2$-$C_{18}$ heteroarylene, $C_3$-$C_{18}$ alicyclylene, and $C_3$-$C_{18}$ heteroalicyclylene that each are or are not substituted by one or more $R_a$ groups;

$R_a$ includes one or more selected from the group consisting of a halogen atom, —CN, —NCO, —OH, —COOH, —SOOH, —COOR$_b$, $C_2$-$C_{10}$ alkyl, $C_2$-$C_{10}$ alkenyl, $C_2$-$C_{10}$ alkynyl, and $C_2$-$C_{10}$ oxaalkyl; and $R_b$ is any $C_1$-$C_{10}$ alkyl.

The positive electrode sheet typically includes a positive electrode current collector and a positive electrode film layer arranged on at least one surface of the positive electrode current collector, and the positive electrode film layer includes a cathode active material.

For example, the positive electrode current collector has two surfaces opposite each other in a thickness direction of the positive electrode current collector, and the positive electrode film layer is arranged on either or both of the two opposite surfaces of the positive electrode current collector.

In some embodiments, the positive electrode current collector may be a metal foil or a composite current collector. For example, the metal foil may be an aluminum foil. The composite current collector may include a polymer material base layer and a metal layer formed on at least one surface of the polymer material base layer. The composite current collector can be prepared by coating a metal material (such as aluminum, an aluminum alloy, nickel, a nickel alloy, titanium, a titanium alloy, silver, and a silver alloy) on a polymer material substrate (such as polypropylene (PP), polyethylene terephthalate (PET), polybutylene terephthalate (PBT), polystyrene (PS), and polyethylene (PE)).

Unless otherwise stated, in the chemical formula of the core, when A refers to two or more elements, the above value range of y is not only intended to define a stoichiometric number of each element as A, but also intended to define a sum of stoichiometric numbers of elements as A. For example, when A refers to two or more elements A1, A2 ... An, stoichiometric numbers y1, y2 ... yn of A1, A2 ... An each need to fall within the value range of y defined in the present application, and a sum of y1, y2 ... yn also needs to fall within the value range. Similarly, when R refers to two or more elements, the value range of R in the present application is defined in the same manner as above.

In an optional embodiment, when A is one, two, three, or four selected from the group consisting of Zn, Al, Na, K, Mg, Mo, W, Ti, V, Zr, Fe, Ni, Co, Ga, Sn, Sb, Nb, and Ge, $A_y$ is $Q_{n1}D_{n2}E_{n3}K_{n4}$, where n1+n2+n3+n4=y, and n1, n2, n3, and n4 each are positive numbers and are not all zero; Q, D, E, and K each are independently one selected from the group consisting of Zn, Al, Na, K, Mg, Mo, W, Ti, V, Zr, Fe, Ni, Co, Ga, Sn, Sb, Nb, and Ge, and optionally, at least one of Q, D, E, and K is Fe; optionally, one of n1, n2, n3, and n4 is zero, and the rest are not zero; more optionally, two of n1, n2, n3, and n4 are zero, and the rest are not zero; and further more optionally, three of n1, n2, n3, and n4 are zero, and the rest is not zero. In the core $Li_{1+x}Mn_{1-y}A_yP_{1-z}R_zO_4$, it is advantageous to dope one, two, three, or four elements A at a manganese position, and optionally, one, two, or three elements A are doped; and it is advantageous to dope one or two elements R at a phosphorus position, which is conducive to uniform distribution of the doped elements.

In the core $Li_{1+x}Mn_{1-y}A_yP_{1-z}R_zO_4$, a value of x is correlated with valence states of A and R and values of y and z, which is intended to ensure that the whole system is electrically neutral. If x has a too-small value, a lithium content of the entire core system will be reduced, which affects a capacity per gram of the material. A value of y will limit a total amount of all doped elements. If the value of y is too small, that is, a doped amount is too small, the doped elements do not play a role; and if the value of y exceeds 0.5, a Mn content in the system will be low, which affects a voltage plateau of the material. The element R is doped at a P position. Because a P—O tetrahedron is relatively stable and a too-large value of z will affect the stability of the material, the value of z is defined in a range of 0.001 to 0.100.

The cathode active material of the present application can improve the capacity per gram, cycling performance, and safety performance of the secondary battery. Although a mechanism is still unclear, it is speculated that this is because the LMP cathode active material of the present application has a core-shell structure as follows: elements A and R are doped into an LMP core at manganese and phosphorus positions, respectively, which can effectively reduce the dissolution of manganese ions to reduce the migration of manganese ions to a negative electrode, reduce an amount of an electrolyte consumed due to decomposition of an SEI film to improve the cycling performance and safety performance of the secondary battery, and promote the adjustment of Mn—O bonds to reduce a barrier potential for migration of lithium ions and promote the migration of lithium ions, thereby improving the rate performance of the secondary battery; the core is coated with a first coating layer including a crystalline pyrophosphate, which can further increase the resistance for migration of manganese to reduce the dissolution of manganese, and reduce a surface lithium content and the contact between the core and an electrolyte to reduce interfacial side reactions and gas production, thereby improving the high-temperature storage performance, cycling performance, and safety performance of the secondary battery; the first coating layer is further coated with a crystalline phosphate coating layer exhibiting an excellent lithium ion conduction ability as a second coating layer, which can effectively reduce interfacial side reactions on a surface of the cathode active material, thereby improving the high-temperature cycling and storage performance of the secondary battery; and the second coating layer is further coated with a carbon layer as a third coating layer, which can further improve the safety performance and kinetic performance of the secondary battery.

In addition, in the core, the element A doped at the manganese position of LMP also helps to reduce a lattice change rate of the LMP material during lithium deintercalation, thereby improving the structural stability of the LMP cathode material, greatly reducing the dissolution of manganese, and reducing the oxygen activity on a surface of particles; and the element R doped at the phosphorus position also helps to change the difficulty in changing a Mn—O bond length, thereby improving the electron conductance, reducing a barrier potential for migration of lithium ions, promoting the migration of lithium ions, and improving the rate performance of the secondary battery.

In addition, by keeping the entire core system electrically neutral, defects and impurity phases in the cathode active material can be minimized. If there is an excess amount of a transition metal (such as manganese) in the cathode active material, due to a relatively-stable structure of the material itself, the excess transition metal may be precipitated in a form of an elementary substance, or may lead to an impurity phase inside a lattice. Such an impurity phase can be minimized by keeping the entire core system electrically neutral. In addition, by keeping the entire core system electrically neutral, lithium vacancies can be produced in the material in some cases to make the material have excellent kinetic performance, thereby improving the kinetic performance of the secondary battery.

In addition, in the non-aqueous electrolyte, the first lithium salt is adopted as a main lithium salt, and due to excellent thermal stability and hydrolysis resistance, the first lithium salt can effectively reduce an acidity of the electrolyte, reduce the dissolution of manganese ions, and improve the high-temperature cycling and storage performance. An isocyanate-based compound shown in Formula 1 is introduced into the non-aqueous electrolyte, and the isocyanate-based compound can react with trace water in a battery to produce —NHCOOH and thus can prevent the trace water from reacting with the non-aqueous electrolyte to produce HF, which can further reduce the acidity of the electrolyte and the dissolution of manganese ions, thereby improving the high-temperature cycling and storage performance. In addition, the isocyanate-based compound shown in Formula 1 can also form a uniform SEI film at a negative electrode, which can reduce the reduction of dissolved Mn at the negative electrode to further improve the high-temperature cycling and storage performance.

Positions of main characteristic peaks in an X-ray diffraction (XRD) pattern of the LMP doped with elements A and R are consistent with those of undoped $LiMnPO_4$, indicating that no impurity phase is introduced during doping. Therefore, the improvement of performance of the core is mainly derived from element doping rather than an impurity phase. After the cathode active material is prepared by the inventors of the present application, a middle region of a particle of the prepared cathode active material is cut by a focused ion beam (FIB) and then tested by transmission electron microscopy (TEM) and energy-dispersive X-ray spectroscopy (EDS), and test results show that elements are evenly distributed in the cathode active material without aggregation.

In the present application, the "crystalline" means that a crystallinity is 50% or more, namely, 50% to 100%. A crystallinity of less than 50% corresponds to a glassy state. The crystalline pyrophosphate and crystalline phosphate of the present application each have a crystallinity of 50% to 100%. The pyrophosphate and phosphate with a specified crystallinity can give full play to an ability of the pyrophosphate coating layer to hinder the dissolution of manganese ions, the excellent lithium ion conduction of the phosphate coating layer, and the reduction of interfacial side reactions, and can also facilitate well lattice matching between the pyrophosphate coating layer and the phosphate coating layer to allow tight bonding between the two coating layer.

In the present application, the crystallinity of the crystalline pyrophosphate in the first coating layer and the crystallinity of the crystalline phosphate in the second coating layer in the cathode active material may be tested by a conventional technical means in the prior art, such as densitometry, infrared (IF) spectrometry, differential scanning calorimetry (DSC), and nuclear magnetic resonance (NMR) absorption, and may also be tested by an XRD method, for example.

Specifically, the XRD method for testing the crystallinity of the crystalline pyrophosphate in the first coating layer and the crystallinity of the crystalline phosphate in the second coating layer in the cathode active material may include the following steps:

a specified amount of the cathode active material powder is taken and tested by X-rays for a total scattering intensity, where the total scattering intensity is a sum of scattering intensities of substances in the entire space, and is only related to an intensity of primary rays, a chemical structure of the cathode active material powder, and a total number of electrons (namely, mass) participating in diffraction, and is independent of an order state of a sample; and then crystalline scattering and non-crystalline scattering are then separated from a diffraction pattern, and the crystallinity is a ratio of a scattering intensity of a crystalline part to a total scattering intensity.

It should be noted that, in the present application, the crystallinity of each of the pyrophosphate and phosphate in the coating layers may be adjusted by adjusting conditions of a sintering process such as sintering temperature and sintering time, for example.

In the present application, because metal ions are difficult to migrate in the pyrophosphate, the pyrophosphate as the first coating layer can effectively isolate doped metal ions from an electrolyte. The crystalline pyrophosphate has a stable structure, and thus the crystalline pyrophosphate coating layer can effectively inhibit the dissolution of a transition metal and improve the cycling performance.

The bonding between the first coating layer and the core is similar to a heterojunction, and a strength of the bonding is limited by a degree of lattice matching. When a lattice mismatch is 5% or less, the lattice matching is excellent, and the first coating layer and the core are easily bonded tightly. The tight bonding can ensure that the coating layer will not fall off during subsequent cycling, which is conducive to the long-term stability of the material. A strength of the bonding between the first coating layer and the core is mainly measured by calculating a mismatch degree of each lattice constant between the core and the coating layer. In the present application, compared with an undoped core, a matching degree between the core doped with elements A and R and the first coating layer is improved, and the core doped with elements A and R and the pyrophosphate coating layer can be tightly bonded.

The crystalline phosphate is adopted as the second coating layer, because the crystalline phosphate has a high lattice matching degree (mismatch degree: only 3%) with the crystalline pyrophosphate of the first coating layer, and the crystalline phosphate itself has higher stability than the crystalline pyrophosphate, such that the coating of the crystalline pyrophosphate with the crystalline phosphate is conducive to improvement of stability of the material. The crystalline phosphate has a very stable structure and exhibits an excellent lithium ion conduction ability, and thus the coating with the crystalline phosphate can effectively reduce interfacial side reactions on a surface of the cathode active material, thereby improving the high-temperature cycling and storage performance of the secondary battery. A lattice matching manner between the second coating layer and the first coating layer is similar to the bonding between the first coating layer and the core mentioned above. When a lattice mismatch is 5% or less, the lattice matching is excellent, and the second coating layer and the first coating layer are easily bonded tightly.

The carbon is adopted as the third coating layer mainly because a carbon layer has excellent electronic conductivity. Since an electrochemical reaction occurring during use of the secondary battery requires the participation of electrons, in order to increase the electron transport between a particle and another particle and the electron transport between different positions on a particle, the carbon with excellent electronic conductivity can be used to coat a cathode active material. The carbon coating can effectively improve the electronic conductivity and desolvation ability of the cathode active material.

Each coating layer of the present application may completely or partially cover an underlying layer.

In some embodiments, the non-aqueous electrolyte includes a first lithium salt and a first additive, and the first lithium salt is present as a main lithium salt.

$LiN(C_mF_{2m+1}SO_2)(C_nF_{2n+1}SO_2)$ in the first lithium salt may be selected from the group consisting of any corresponding specific compounds in the prior art, where in some embodiments, m and n each are independently selected from the group consisting of 0, 1, 2, and 3, so as to provide more excellent thermal stability. For example, $LiN(C_mF_{2m+1}SO_2)(C_nF_{2n+1}SO_2)$ can be selected from the group consisting of lithium (trifluoromethanesulfonimide)(fluorosulfonimide) ($Li(CF_3SO_2)(FSO_2)N$), lithium bis(trifluoromethanesulfonimide) ($LiN(CF_3SO_2)_2$), lithium bis(pentafluoroethanesulfonimide) ($LiN(C_2F_5SO_2)_2$), lithium (trifluoromethanesulfonimide)(pentafluoroethanesulfonimide) ($LiN(CF_3SO_2)(C_2F_5SO_2)$), lithium (trifluoromethanesulfonimide)(heptafluoropropanesulfonimide) ($LiN(CF_3SO_2)(C_3F_7SO_2)$), lithium (trifluoromethanesulfonimide)(nonafluorobutanesulfonimide) ($LiN(CF_3SO_2)(C_4F_9SO_2)$), lithium (pentafluoroethanesulfonimide)(heptafluoropropanesulfonimide) ($LiN(C_2F_5SO_2)(C_3F_7SO_2)$), and $Li(FSO_2)_2N$).

The isocyanate compound shown in Formula 1 used in the present application can be selected from the group consisting of common isocyanate compounds for electrolytes in the prior art. In some embodiments, $R_1$ is any one selected from the group consisting of $C_2$-$C_{10}$ alkylene, $C_2$-$C_{10}$ oxaalkylene, $C_2$-$C_{10}$ azaalkylene, phenylene, naphthylene, anthracenylene, cyclobutylene, cyclopentylene, cyclohexylene, biphenylene, and methylenediphenylene that each are or are not substituted by one or more $R_a$ groups, and optionally, $R_1$ is any one selected from the group consisting of $C_2$-$C_6$ alkylene, phenylene, naphthylene, anthracenylene, cyclobutylene, cyclopentylene, cyclohexylene, biphenylene, and methylenediphenylene that each are or are not substituted by one or more $R_a$ groups; and/or $R_a$ includes one or more selected from the group consisting of a halogen atom, —CN, and $C_2$-$C_3$ alkyl; and/or there is 0, 1, 2, 3, or 4 $R_a$ groups in a compound shown in Formula 1.

Optionally, the first additive includes one or more selected from the group consisting of the following compounds:

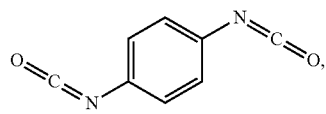

-continued
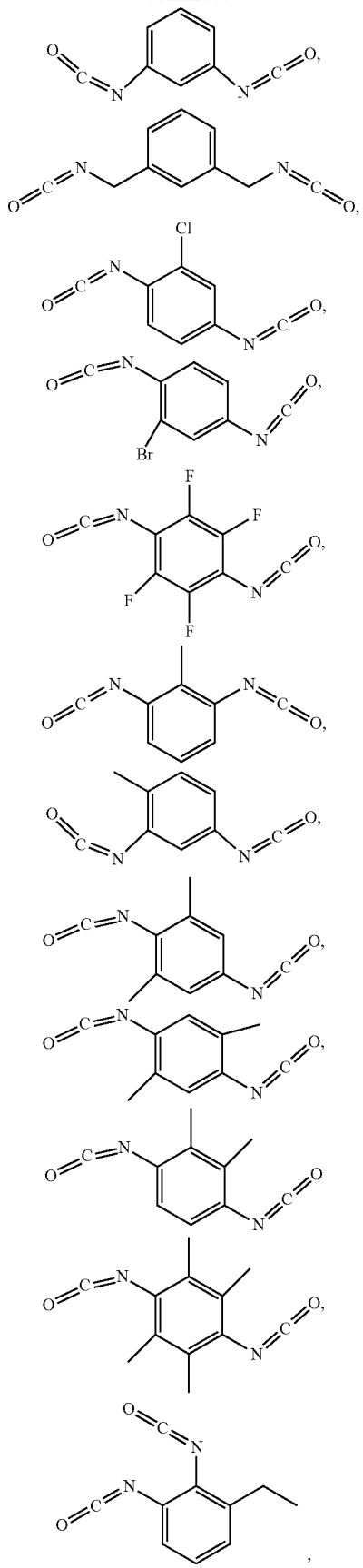
-continued
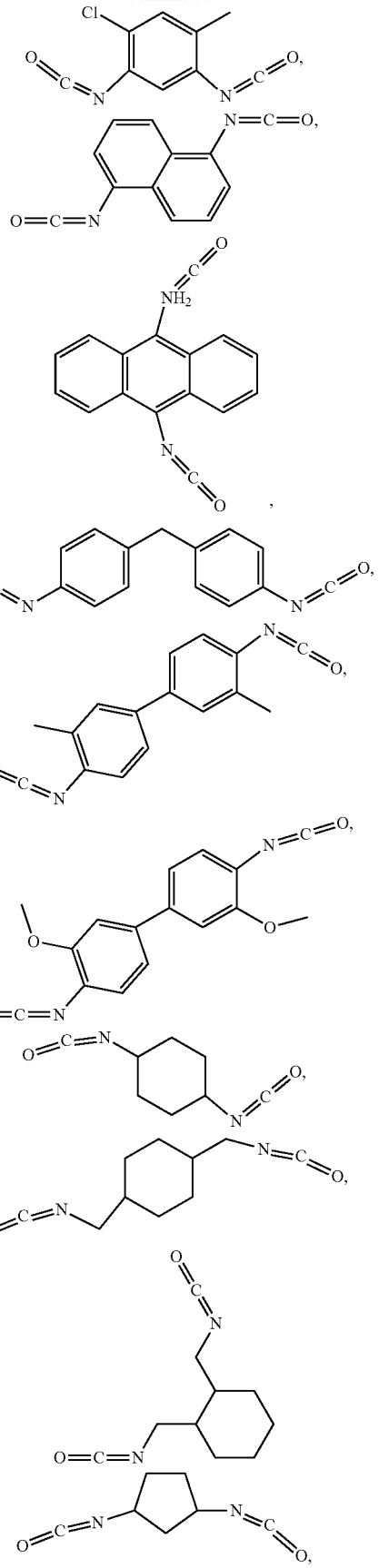

-continued

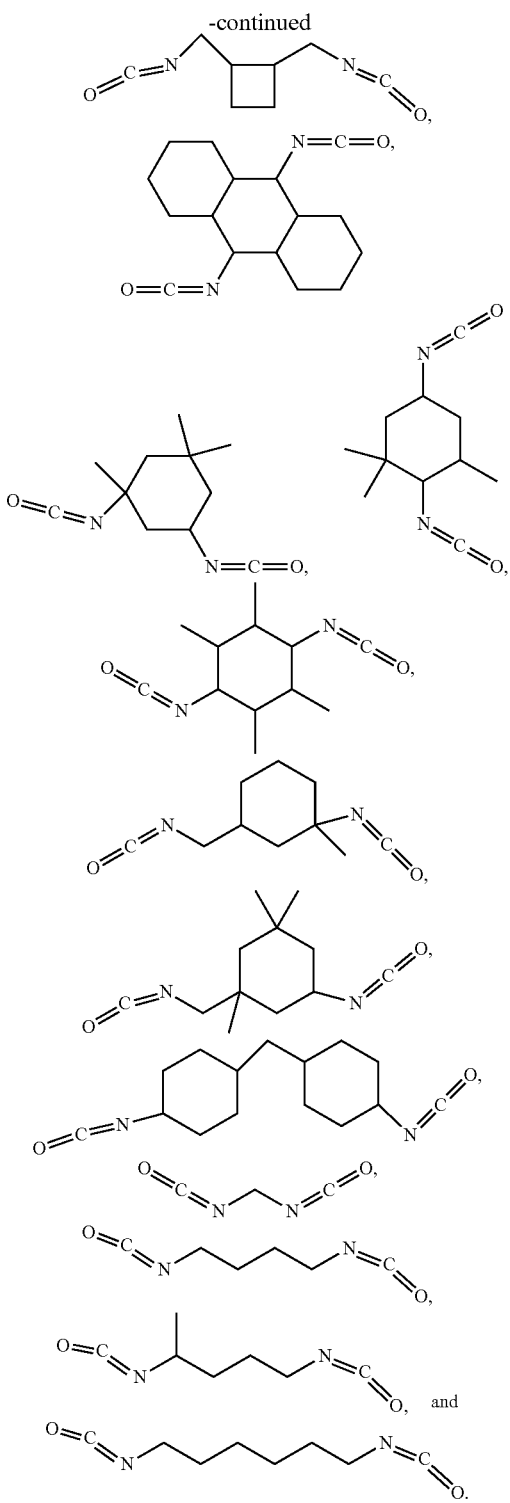

The compound has excellent dispersibility and solubility in a solvent of the non-aqueous electrolyte, and the compound can fully react with trace water in a battery to produce —NHCOOH and thus can prevent the trace water from reacting with the non-aqueous electrolyte to produce HF, which can further reduce the acidity of the electrolyte and the dissolution of manganese ions, thereby improving the high-temperature cycling and storage performance. In addition, the isocyanate-based compound is easy to form a uniform SEI film at a negative electrode, which helps to reduce the reduction of dissolved Mn at the negative electrode to further improve the high-temperature cycling and storage performance.

In some embodiments of the present application, when the first lithium salt is any one selected from the group consisting of $LiN(CF_3SO_2)(FSO_2)$, $LiN(CF_3SO_2)(C_2F_5SO_2)$, and $LiN(CF_3SO_2)(C_3F_7SO_2)$, the first additive is any one selected from the group consisting of the following compounds:

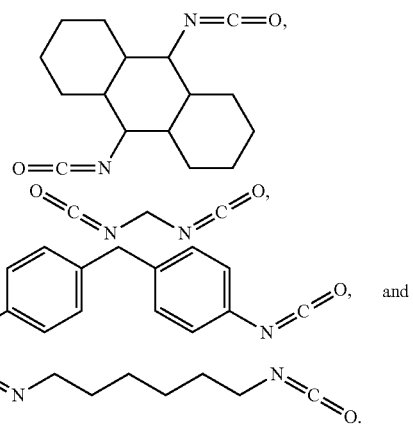

In this case, the first lithium salt and the first additive can give full play to their respective advantages, and can reduce the acidity of the electrolyte, reduce the dissolution of manganese ions, and avoid the deterioration of impedance of a negative electrode, thereby improving the high-temperature cycling and storage performance of an LIB without affecting the capacity and rate performance of the LIB.

Although the use of the first lithium salt as a main lithium salt of the non-aqueous electrolyte can effectively improve the high-temperature cycling and storage performance of the secondary battery, this lithium salt may cause corrosion under some conditions, for example, when a working voltage of an LIB is higher than 4.2 V, an aluminum foil may undergo corrosion, which may have the following mechanism: an original oxide film on a surface of the aluminum foil is destroyed in the electrolyte to expose highly-active aluminum, then the aluminum is oxidized to produce $Al_{3+}$ ions, then $FSI^-$ or $TFSI^-$ in the electrolyte is combined with $Al^{3+}$ to produce soluble $Al(FSI)_3$ or $Al(TFSI)_3$, and the dissolution of $Al(FSI)_3$ or $Al(TFSI)_3$ causes corrosion of aluminum. Therefore, in order to alleviate the aluminum foil corrosion caused by the first lithium salt at a high working voltage, in some embodiments, based on a total weight of the non-aqueous electrolyte, a content of the first lithium salt is W1 wt %, and W1 is 0.1 to 48 and optionally 5 to 20.

In some embodiments, on the basis of controlling the content of the first lithium salt, a second lithium salt can be added to supplement a lithium salt in the non-aqueous electrolyte, that is, the non-aqueous electrolyte further includes a second lithium salt, and the second lithium salt includes one or more selected from the group consisting of LiDFP, LiDFBOP, LIODFB, LiBOB, $LiPF_6$, $LiBF_4$, and $LiAsF_6$. The second lithium salt added as a lithium salt-type additive to the non-aqueous electrolyte will preferentially be decomposed on a surface of an aluminum foil, and a decomposition product will combine with aluminum ions to produce a nonsoluble or insoluble precipitate adhered to the surface of the aluminum foil to form a passivation film, which can prevent direct contact between the aluminum foil and the electrolyte to protect the aluminum foil and thus cooperates with the first lithium salt to improve the high-temperature cycling and storage performance.

However, a too-high content of the lithium salt-type additive will increase the impedance of positive and negative electrodes and make an LIB have an abnormal capacity and deteriorated rate performance. In some embodiments, based on a total weight of the non-aqueous electrolyte, a content of the second lithium salt is set as W3 wt %, and W3 is 0.01 to 20 and optionally 0.1 to 10 or 0.3 to 5. When a mass proportion of the second lithium salt in the electrolyte is in the above range, it can inhibit the corrosion of an aluminum foil and improve the high-temperature cycling and storage performance of an LIB without deteriorating the capacity and rate performance of the LIB.

Although the first additive can form a uniform SEI film at a negative electrode and reduce the reduction of dissolved Mn at the negative electrode to further improve the high-temperature cycling and storage performance, a too-high content of the isocyanate-based compound will increase the impedance of the negative electrode and make an LIB have an abnormal capacity and deteriorated rate performance. Optionally, a content of the first additive is set as W2 wt %, and W2 is 0.01 to 20 and optionally 0.1 to 10 or 0.3 to 5. When a mass proportion of the first additive in the electrolyte is in the above range, it can reduce the acidity of the electrolyte, reduce the dissolution of manganese ions, and avoid the deterioration of impedance of a negative electrode, thereby improving the high-temperature cycling and storage performance of an LIB without affecting the capacity and rate performance of the LIB.

In some embodiments, W2/W1 is defined as M, and M is 0.001 to 3 and optionally 0.005 to 0.5; and (W2+W3)/W1 is defined as N, and N is 0.01 to 2 and optionally 0.02 to 1.

When W1/W2 and (W2+W3)/W1 are within the above respective ranges, the first lithium salt, the first additive, and the second lithium salt can play an excellent synergistic role to ensure low acidity of a system, reduced dissolution of manganese ions, and excellent high-temperature cycling and storage performance of an LIB, and can also effectively inhibit the corrosion of an aluminum foil and improve the high-temperature cycling and storage performance of an LIB without deteriorating the capacity and rate performance of the LIB.

In some embodiments, the non-aqueous electrolyte further includes a second additive, and the second additive includes one or more selected from the group consisting of an unsaturated bond-containing cyclic carbonate compound, a halogen-substituted saturated cyclic carbonate compound, a sulfate compound, a sulfite compound, a sultone compound, a disulfonic acid compound, a nitrile compound, an aromatic compound, a phosphonitrile compound, a cyclic anhydride compound, a phosphite compound, a phosphate compound, and a borate compound. Those skilled in the art may select a corresponding second additive from the group consisting of the above compounds according to actual needs, and a content of the second additive in the non-aqueous electrolyte may also be determined with reference to the prior art, which will not be repeated here.

In some embodiments, the non-aqueous electrolyte further includes an organic solvent, and a type of the organic solvent is not particularly limited and can be determined according to actual needs. Specifically, the organic solvent includes one or more selected from the group consisting of a cyclic carbonate compound, a chain carbonate compound, and a carboxylate compound, and optionally, the organic solvent includes one or more selected from the group consisting of DMC, DEC, DPC, EMC, MPC, EPC, EC, PC, BC, γ-butyrolactone, methyl formate, ethyl formate, methyl acetate, ethyl acetate, propyl acetate, methyl propionate, ethyl propionate, butyl propionate, and THF.

In some embodiments, based on a weight of the core, a coating amount of the first coating layer is set as C1 wt %, and C1 is greater than 0 and less than or equal to 6, optionally greater than 0 and less than or equal to 5.5, and more optionally greater than 0 and less than or equal to 2; and/or based on the weight of the core, a coating amount of the second coating layer is set as C2 wt %, and C2 is greater than 0 and less than or equal to 6, optionally greater than 0 and less than or equal to 5.5, and more optionally 2 to 4; and/or based on the weight of the core, a coating amount of the third coating layer is set as C3 wt %, and C3 is greater than 0 and less than or equal to 6, optionally greater than 0 and less than or equal to 5.5, and more optionally greater than 0 and less than or equal to 2.

In the present application, a coating amount of each coating layer is not zero.

In the cathode active material with the core-shell structure in the above embodiment, the coating amounts of the three coating layers are optionally in the above ranges, respectively, such that the core can be fully coated, and the kinetic performance and safety performance of the secondary battery can be further improved without sacrificing a capacity per gram of the cathode active material.

The control of the coating amount of the first coating layer in the above range can avoid the following problems: a too-small coating amount (which means that the first coating layer is too thin) may not effectively hinder the migration of a transition metal; and a too-large coating amount (which means that the first coating layer is too thick) may affect the migration of $Li^+$, thereby affecting the rate performance of the material.

The control of the coating amount of the second coating layer in the above range can avoid the following problems: a too-large coating amount may affect the overall voltage plateau of the material; and a too-small coating amount may not allow a sufficient coating effect.

For the third coating layer, the carbon coating mainly plays a role of enhancing electron transport among particles, but due to a large amount of amorphous carbon in the structure, a carbon density is low. Therefore, if the coating amount of the third coating layer is too large, a compacted density of an electrode sheet will be affected.

In the cathode active material with the core-shell structure in the above embodiment, the coating amounts of the three coating layers are preferably in the above ranges, respectively, such that the core can be fully coated, and the kinetic performance and safety performance of the secondary battery can be further improved without sacrificing a capacity per gram of the cathode active material.

In some embodiments, a ratio of (W1+W2)/(C1+C2+C3) is defined as Q, and Q is 0.1 to 10 and optionally 0.5 to 5. If the Q value is smaller than the above range, the lithium salt and the additive are not enough to reduce the acidity of the electrolyte, cannot fully and completely inhibit the dissolution of manganese ions, and can only lead to insufficient improvement for the high-temperature cycling and storage performance. If the Q value is larger than the above range, the film-forming impedance is too large, which affects the improvement of the capacity and rate performance of an LIB.

In any embodiment, for the crystalline pyrophosphate in the first coating layer, an interplanar crystal spacing is in a range of 0.293 nm to 0.470 nm and an angle of a crystal orientation (111) is in a range of 18.00° to 32.00°; and for the crystalline phosphate in the second coating layer, an interplanar crystal spacing is in a range of 0.244 nm to 0.425 nm and an angle of a crystal orientation (111) is in a range of 20.00° to 37.00°.

The crystalline pyrophosphate and crystalline phosphate in the coating layers can be characterized by conventional techniques in the prior art, or can also be characterized by TEM, for example. Under TEM, the core and coating layers can be distinguished by testing an interplanar crystal spacing.

A specific test method for the interplanar crystal spacings and angles of the crystalline pyrophosphate and crystalline phosphate in the coating layers may include the following steps:

a specified amount of a powder sample of the coated cathode active material is taken and added to a test tube, then a solvent such as alcohol is injected into the test tube, and a resulting mixture is thoroughly stirred for dispersion; then an appropriate amount of a resulting solution is taken by a clean disposable plastic straw and added dropwise to a 300-mesh copper mesh, such that a part of the powder remains on the copper mesh; the copper mesh with the sample is transferred to a TEM sample cavity and tested to obtain an original TEM image, and the original TEM image is saved;

the original TEM image is opened in the diffractometer software and subjected to Fourier transformation to obtain a diffraction pattern; and a distance from a diffraction spot to a center position in the diffraction pattern is measured to obtain the interplanar crystal spacing, and the angle is calculated according to a Bragg equation.

There is a difference between an interplanar crystal spacing range of the crystalline pyrophosphate and an interplanar crystal spacing range of the crystalline phosphate, and the difference can be directly determined according to interplanar crystal spacing values.

The first and second coating layers in the cathode active material of the above embodiment both adopt a crystalline substance. When the interplanar crystal spacing and angle for each of the crystalline substances of the two coating layers are within the above respective ranges, the coating layers can be effectively prevented from including an impurity phase, thereby improving the capacity per gram, cycling performance, and rate performance of the material.

Moreover, the crystalline pyrophosphate and crystalline phosphate in the above interplanar crystal spacing and angle ranges can effectively inhibit the lattice change rate and manganese ion dissolution of LMP during lithium deintercalation, thereby improving the high-temperature cycling performance, cycling stability, and high-temperature storage performance of the secondary battery.

In some embodiments, in the core, a ratio of y to 1−y is 1:10 to 1:1 and optionally 1:4 to 1:1. When the above conditions are met, the energy density and cycling performance of the secondary battery with the cathode active material can be further improved.

In some embodiments, in the core, a ratio of z to 1−z is 1:9 to 1:999 and optionally 1:499 to 1:249. z here represents a sum of stoichiometric numbers of elements R doped at a P position.

When the above conditions are met, the energy density and cycling performance of the secondary battery with the cathode active material can be further improved.

In some embodiments, the carbon of the third coating layer is a mixture of SP2-hybridized carbon and SP3-hybridized carbon, and optionally, a molar ratio of the SP2-hybridized carbon to the SP3-hybridized carbon is any value in a range of 0.1 to 10 and is optionally any value in a range of 2.0 to 3.0.

In some embodiments, the molar ratio of the SP2-hybridized carbon to the SP3-hybridized carbon may be about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, or any other value in the above range.

In the present application, "about" before a number indicates a range of the number 10%.

A form of carbon in the carbon coating layer is selected to improve the comprehensive electrical performance of the secondary battery. Specifically, the use of the mixture of SP2-hybridized carbon and SP3-hybridized carbon and the control of the ratio of the SP2-hybridized carbon to the SP3-hybridized carbon in a specified range can avoid the following problems: if carbon in the coating layer is totally amorphous SP3-hybridized carbon, the electronic conductivity is poor; and if carbon in the coating layer is totally graphitized SP2-hybridized carbon, the electronic conductivity is excellent, but there are few lithium ion channels, which is not conducive to lithium deintercalation. In addition, the control of the molar ratio of the SP2-hybridized carbon to the SP3-hybridized carbon in the above range can allow excellent electronic conductivity and ensure lithium ion channels, and thus is conducive to improvement of the function and cycling performance of the secondary battery.

The mixing ratio of the SP2-hybridized carbon and SP3-hybridized carbon in the third carbon coating layer can be controlled by controlling sintering conditions such as sintering temperature and sintering time. For example, in the case of using sucrose as a carbon source to prepare the third coating layer, the sucrose is subjected to pyrolysis and deposited on the second coating layer at a high temperature to produce a carbon coating layer with both SP2-hybridized carbon and SP3-hybridized carbon. The ratio of SP2-hybridized carbon to SP3-hybridized carbon can be adjusted by controlling high-temperature pyrolysis and sintering conditions.

The structure and characteristics of carbon in the third coating layer can be determined by Raman spectroscopy, and a specific test method is as follows: an energy spectrum of a Raman test is subjected to peak differentiation to obtain Id/Ig (where Id represents a peak intensity of the SP3-hybridized carbon and Ig represents a peak intensity of the SP2-hybridized carbon), thereby determining the molar ratio of the two.

In some embodiments, the first coating layer has a thickness of 1 nm to 10 nm; and/or the second coating layer has a thickness of 2 nm to 15 nm; and/or the third coating layer has a thickness of 2 nm to 25 nm.

In some embodiments, the first coating layer may have a thickness of about 2 nm, about 3 nm, about 4 nm, about 5 nm, about 6 nm, about 7 nm, about 8 nm, about 9 nm, about 10 nm, or any other value in the above range.

In some embodiments, the second coating layer may have a thickness of about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or any other value in the above range.

In some embodiments, the third coating layer may have a thickness of about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, or any other value in the above range.

When the thickness of the first coating layer is in a range of 1 nm to 10 nm, it can avoid the problems that a too-large thickness may have an adverse effect on the kinetic performance of the material and a too-small thickness cannot effectively hinder the migration of transition metal ions.

When the thickness of the second coating layer is in a range of 2 nm to 15 nm, the second coating layer has a stable surface structure undergoing few side reactions with an electrolyte, and thus can effectively reduce interfacial side reactions, thereby further improving the high-temperature performance of the secondary battery.

When the thickness of the third coating layer is in a range of 2 nm to 25 nm, the electric conductivity of the material and the compacted density performance of a battery electrode sheet prepared with the cathode active material can be further improved.

A thickness of each coating layer is mainly measured by FIB, and a specific test method may include the following steps: a single particle is randomly selected from a cathode active material powder to be tested, a thin sheet with a thickness of about 100 nm is cut just at or near a middle position of the selected particle and then subjected to a TEM test, and a thickness of a coating layer is measured, where 3 to 5 positions are measured and then an average is taken.

In some embodiments, based on a weight of the cathode active material, a manganese content is in a range of 10 wt % to 35 wt %, optionally in a range of 15 wt % to 30 wt %, and more optionally in a range of 17 wt % to 20 wt %; a phosphorus content is in a range of 12 wt % to 25 wt % and optionally in a range of 15 wt % to 20 wt %; and a weight ratio of manganese to phosphorus is in a range of 0.90 to 1.25 and optionally in a range of 0.95 to 1.20.

In the present application, in the case where only the core of the cathode active material includes manganese, the manganese content in the cathode active material may correspond to a manganese content in the core.

In the above embodiment, the control of the manganese content in the above range can effectively avoid the problem that a too-high manganese content may lead to deteriorated structural stability and decreased density of the material, thereby effectively improving the cycling, storage, and compacted density performance of the secondary battery; and the control of the manganese content in the above range can also avoid the problem that a too-low manganese content may lead to low voltage plateau, thereby further improving an energy density of the secondary battery.

In the above embodiment, the control of the phosphorus content in the above range can effectively avoid the following problems: a too-high phosphorus content may cause the too-strong covalence of P—O to affect the electric conduction of small polarons, thereby affecting the electric conductivity of the material; and a too-low phosphorus content may reduce the stability of the core and the lattice structures of the pyrophosphate in the first coating layer and/or the phosphate in the second coating layer, thereby affecting the overall stability of the material.

The weight ratio of manganese to phosphorus has the following effects on the performance of the secondary battery: a too-large weight ratio (which means that there is too much manganese) will increase the dissolution of manganese ions and affect the stability and capacity per gram of the cathode active material, thereby affecting the cycling performance and storage performance of the secondary battery; and a too-small weight ratio (which means that there is too much phosphorus) is easy to cause the generation of impurity phases and will reduce the discharge voltage plateau of the material, thereby reducing the energy density of the secondary battery.

The manganese and phosphorus contents may be measured by conventional technical means in the prior art. In particular, the manganese and phosphorus contents are determined by the following method: the material is dissolved in dilute hydrochloric acid (concentration: 10% to 30%), a content of each element in a resulting solution is tested by inductively coupled plasma (ICP), and then a manganese content is measured and converted to obtain a weight proportion of manganese.

In some embodiments, a lattice change rate of the cathode active material with the core-shell structure before and after complete lithium deintercalation is 4% or less, optionally 3.8% or less, and more optionally 2.0% to 3.8%.

A lithium deintercalation process of LMP ($LiMnPO_4$) is a two-phase reaction. An interfacial stress between the two phases is determined by the lattice change rate before and after lithium deintercalation; and the smaller the lattice change rate, the smaller the interfacial stress and the easier the $Li^+$ transport. Therefore, the reduction of a lattice change rate of the core can enhance the transport ability of $Li^+$, thereby improving the rate performance of the secondary battery. The cathode active material with the core-shell structure in the above embodiment can allow a lattice change rate of 4% or less before and after lithium deintercalation, and thus the use of the cathode active material can improve the rate performance of the secondary battery. The lattice change rate can be measured by a method known in the prior art, such as XRD.

In some embodiments, a Li/Mn antisite defect concentration of the cathode active material with the core-shell structure is 4% or less, optionally 2.2% or less, and more optionally 1.5% to 2.2%.

The Li/Mn antisite defect in the present application refers to the exchange of positions of $Li^+$ and $Mn^{2+}$ in a $LiMnPO_4$ lattice. Correspondingly, the Li/Mn antisite defect concentration refers to a percentage of an amount of $Li^+$ exchanging with $Mn^{2+}$ in a total amount of $Li^+$. In the present application, the Li/Mn antisite defect concentration may be tested according to JIS K 0131-1996, for example.

The cathode active material with the core-shell structure in the above embodiment can allow the low Li/Mn antisite defect concentration described above. Although a mechanism is still not very clear, it is speculated by the inventors of the present application that, since $Li^+$ and $Mn^{2+}$ in a $LiMnPO_4$ lattice will be subjected to a position exchange and a $Li^+$ transport channel is a one-dimensional (1D) channel, $Mn^{2+}$ is difficult to migrate in the $Li^+$ channel, which hinders the transport of $Li^+$. Thus, the low Li/Mn antisite defect concentration of the cathode active material with the core-shell structure provided by the present application in the above range can prevent $Mn^{2+}$ from hindering the transport of $Li^+$ and improve the capacity per gram and rate performance of the cathode active material.

In some embodiments, a compacted density of the cathode active material at 3 T is 2.2 $g/cm^3$ or more and is optionally more than or equal to 2.2 $g/cm^3$ and less than or equal to 2.8 $g/cm^3$. The higher the compacted density, the greater the weight of the active material per unit volume.

Therefore, the increase of the compacted density is conducive to improvement of a volumetric energy density of a battery cell. The compacted density can be measured according to GB/T 24533-2009.

In some embodiments, a surface oxygen valence state of the cathode active material is −1.90 or less and is optionally −1.90 to −1.98.

A stable valence state of oxygen is −2. The closer the valence state of oxygen is to −2, the stronger the electron-acquiring ability of oxygen, that is, the stronger the oxidation of oxygen. Normally, the surface oxygen valence state of the cathode active material is −1.7 or less. In the above embodiment, the control of the surface oxygen valence state of the cathode active material in the above range can reduce the interfacial side reactions between the cathode material and the electrolyte, thereby improving the cycling performance and gas production performance during high-temperature storage of a battery cell.

The surface oxygen valence state can be measured by a method known in the prior art, such as electron energy loss spectroscopy (EELS).

The present application also provides a preparation method of the cathode active material, including the following steps:

preparation of a core material: the core has a chemical formula of $Li_{1+x}Mn_{1-y}A_yP_{1-z}R_zO_4$, where x is any value in a range of −0.100 to 0.100, y is any value in a range of 0.001 to 0.500, and z is any value in a range of 0.001 to 0.100; A is one or more selected from the group consisting of Zn, Al, Na, K, Mg, Mo, W, Ti, V, Zr, Fe, Ni, Co, Ga, Sn, Sb, Nb, and Ge, and is optionally one or more selected from the group consisting of Fe, Ti, V, Ni, Co, and Mg; and R is one or more selected from the group consisting of B, Si, N, and S, and is optionally one selected from the group consisting of B, Si, N, and S; and coating: a suspension of $Li_aMP_2O_7$ and/or $M_b(P_2O_7)_c$ and $XPO_4$ is prepared, the core material is added to the suspension, and a resulting mixture is mixed and sintered to obtain the cathode active material, where $0 \leq a \leq 2$, $1 \leq b \leq 4$, and $1 \leq c \leq 6$; values of a, b, and c meet the following condition: keeping the crystalline pyrophosphate $Li_aMP_2O_7$ or $M_b(P_2O_7)_c$ electrically neutral; M is independently one or more selected from the group consisting of Fe, Ni, Mg, Co, Cu, Zn, Ti, Ag, Zr, Nb, and Al; and X is one or more selected from the group consisting of Li, Fe, Ni, Mg, Co, Cu, Zn, Ti, Ag, Zr, Nb, and Al.

The cathode active material has a core-shell structure including a core and a shell covering the core, where the shell includes a first coating layer covering the core, a second coating layer covering the first coating layer, and a third coating layer covering the second coating layer; the first coating layer includes a crystalline pyrophosphate $Li_aMP_2O_7$ and/or a crystalline pyrophosphate $M_b(P_2O_7)_c$; the second coating layer includes a crystalline phosphate $XPO_4$; and the third coating layer is carbon.

In some embodiments, the preparation of a core material includes the following steps:

step (1): a manganese source, an element A-doping agent, and an acid are mixed and stirred in a container to obtain an element A-doped manganese salt particle; and step (2): the element A-doped manganese salt particle, a lithium source, a phosphorus source, and an element R-doping agent are mixed in a solvent to obtain a slurry, and the slurry is sintered under protection of an inert gas atmosphere to obtain a core doped with elements A and R, where the core doped with elements A and R is $Li_{1+x}Mn_{1-y}A_yP_{1-z}R_zO_4$, where x is any value in a range of −0.100 to 0.100, y is any value in a range of 0.001 to 0.500, and z is any value in a range of 0.001 to 0.100; A is one or more selected from the group consisting of Zn, Al, Na, K, Mg, Mo, W, Ti, V, Zr, Fe, Ni, Co, Ga, Sn, Sb, Nb, and Ge, and is optionally one or more selected from the group consisting of Fe, Ti, V, Ni, Co, and Mg; and R is one or more selected from the group consisting of B, Si, N, and S, and is optionally one selected from the group consisting of B, Si, N, and S.

The preparation method of the present application does not have a specified limitation on a source of a material. A source of an element may include one or more selected from the group consisting of an elementary substance, a sulfate, a halide, a nitrate, an organic acid salt, an oxide, and a hydroxide of the element, provided that the source can allow the objective of the preparation method of the present application.

In some embodiments, the element A-doping agent is one or more selected from the group consisting of an elementary substance, a carbonate, a sulfate, a chloride, a nitrate, an organic acid salt, an oxide, and a hydroxide of one or more selected from the group consisting of Zn, Al, Na, K, Mg, Mo, W, Ti, V, Zr, Fe, Ni, Co, Ga, Sn, Sb, Nb, and Ge.

In some embodiments, the element R-doping agent is one or more selected from the group consisting of an inorganic acid, a linoleic acid, an organic acid, a sulfate, a chloride, a nitrate, an organic acid salt, an oxide, and a hydroxide of one or more selected from the group consisting of B, Si, N, and S.

In the present application, the manganese source may be a manganese-containing substance available for preparation of LMP known in the prior art. For example, the manganese source may be one or more selected from the group consisting of elementary manganese, manganese dioxide, manganese phosphate, manganese oxalate, and manganese carbonate.

In the present application, the acid may be one or more selected from the group consisting of inorganic acids such as hydrochloric acid, sulfuric acid, nitric acid, phosphoric acid, silicic acid, and nisilicic acid and organic acids such as oxalic acid. In some embodiments, the acid is a dilute organic acid with a concentration of 60 wt % or less.

In the present application, the lithium source may be a lithium-containing substance available for preparation of LMP known in the prior art. For example, the lithium source is one or more selected from the group consisting of lithium carbonate, lithium hydroxide, lithium phosphate, and lithium dihydrogen phosphate.

In the present application, the phosphorus source may be a phosphorus-containing substance available for preparation of LMP known in the prior art. For example, the phosphorus source is one or more selected from the group consisting of diammonium phosphate (DAP), monoammonium phosphate (MAP), ammonium phosphate, and phosphoric acid.

In some optional embodiments, after the manganese source, the element A-doping agent, and the acid are mixed in a solvent to allow a reaction to obtain an element A-doped manganese salt suspension, the suspension is filtered, and a filter residue is oven-dried and sand-milled to obtain an element A-doped manganese salt particle with a particle size of 50 nm to 200 nm.

In some optional embodiments, the slurry in step (2) is dried to obtain a powder, and then the powder is sintered to obtain the core doped with elements A and R.

In some embodiments, the mixing in step (1) is conducted at 20° C. to 120° C. and optionally 40° C. to 120° C.; and/or the stirring in step (1) is conducted at 400 rpm to 700 rpm for 1 h to 9 h and optionally 3 h to 7 h.

Optionally, the reaction in step (1) may be conducted at about 30° C., about 50° C., about 60° C., about 70° C., about 80° C., about 90° C., about 100° C., about 110° C., or about 120° C.; the stirring in step (1) is conducted for about 2 h, about 3 h, about 4 h, about 5 h, about 6 h, about 7 h, about 8 h, or about 9 h; and optionally, the reaction temperature and stirring time in step (1) may each be any value in the above respective range.

In some embodiments, the mixing in step (2) is conducted at 20° C. to 120° C. and optionally 40° C. to 120° C. for 1 h to 12 h. Optionally, the reaction in step (2) may be conducted at about 30° C., about 50° C., about 60° C., about 70° C., about 80° C., about 90° C., about 100° C., about 110° C., or about 120° C.; the mixing in step (2) is conducted for about 2 h, about 3 h, about 4 h, about 5 h, about 6 h, about 7 h, about 8 h, about 9 h, about 10 h, about 11 h, or about 12 h; and optionally, the reaction temperature and mixing time in step (2) may each be any value in the above respective range.

When the temperature and time during the preparation of the core particle each are within the above respective range, the prepared core and the cathode active material prepared therefrom have few lattice defects, which can inhibit the dissolution of manganese ions and reduce interfacial side reactions between the cathode active material and the electrolyte, thereby improving the cycling performance and safety performance of the secondary battery.

In some embodiments, optionally, during the preparation of the core doped with elements A and R, a pH of a solution is controlled at 3.5 to 6, optionally at 4 to 6, and more optionally at 4 to 5. It should be noted that, in the present application, a pH of a resulting mixture may be adjusted by a method commonly used in the prior art, for example, by adding an acid or alkali.

In some embodiments, optionally, in step (2), the manganese salt particle, the lithium source, and the phosphorus source are in a molar ratio of 1:(0.5-2.1):(0.5-2.1), and more optionally, the element A-doped manganese salt particle, the lithium source, and the phosphorus source are in a molar ratio of about 1:1:1.

In some embodiments, optionally, the sintering in the preparation of the LMP doped with elements A and R is conducted at 600° C. to 950° C. for 4 h to 10 h in an inert gas or a mixed atmosphere of an inert gas and hydrogen; optionally, the sintering may be conducted at about 650° C., about 700° C., about 750° C., about 800° C., about 850° C., or about 900° C. for about 2 h, about 3 h, about 4 h, about 5 h, about 6 h, about 7 h, about 8 h, about 9 h, or about 10 h; and optionally, the sintering temperature and sintering time may each be any value in the above respective range. In the preparation of the LMP doped with elements A and R, if the sintering temperature is too low and the sintering time is too short, the crystallinity of the core will be low, which affects the overall performance; if the sintering temperature is too high, impurity phases are easy to appear in the core, which affects the overall performance; and if the sintering time is too long, particles of the core will be large, which affects the capacity per gram, compacted density, and rate performance.

In some optional embodiments, optionally, the protective atmosphere is a mixed gas of 70 vol % to 90 vol % of nitrogen and 10 vol % to 30 vol % of hydrogen.

In some embodiments, the coating includes:
first coating: an element M source, a phosphorus source, and an acid and optionally a lithium source are dissolved in a solvent to obtain a first coating layer suspension, the core obtained in the preparation of a core is thoroughly mixed with the first coating layer suspension, and a resulting mixture is dried and then sintered to obtain a material coated with a first coating layer;
second coating: an element X source, a phosphorus source, and an acid are dissolved in a solvent to obtain a second coating layer suspension, the material coated with the first coating layer is thoroughly mixed with the second coating layer suspension, and a resulting mixture is dried and then sintered to obtain a material coated with two coating layers; and
third coating: a carbon source is thoroughly dissolved in a solvent to obtain a third coating layer solution, then the material coated with the two coating layers is added to the third coating layer solution, and a resulting mixture is thoroughly mixed, dried, and then sintered to obtain a material coated with three coating layers, which is the cathode active material.

In some embodiments, the element M source is one or more selected from the group consisting of an elementary substance, a carbonate, a sulfate, a chloride, a nitrate, an organic acid salt, an oxide, and a hydroxide of one or more selected from the group consisting of Fe, Ni, Mg, Co, Cu, Zn, Ti, Ag, Zr, Nb, and Al.

In some embodiments, the element X source is one or more selected from the group consisting of an elementary substance, a carbonate, a sulfate, a chloride, a nitrate, an organic acid salt, an oxide, and a hydroxide of one or more selected from the group consisting of Li, Fe, Ni, Mg, Co, Cu, Zn, Ti, Ag, Zr, Nb, and Al.

The source of each of the elements A, R, M, and X is added at an amount depending on a target doping amount, and a ratio of the lithium source, the manganese source, and the phosphorus source corresponds to a stoichiometric ratio.

For example, the carbon source is one or more selected from the group consisting of starch, sucrose, glucose, polyvinyl alcohol (PVA), polyethylene glycol (PEG), and citric acid.

In some embodiments, during the first coating, a pH of a solution in which the element M source, the phosphorus source, and the acid and optionally the lithium source are dissolved is controlled at 3.5 to 6.5, and a resulting system is stirred to allow a reaction for 1 h to 5 h, then heated to 50° C. to 120° C. and kept at this temperature for 2 h to 10 h, and/or sintered at 650° C. to 800° C. for 2 h to 6 h.

Optionally, during the first coating, the reaction is fully conducted. Optionally, during the first coating, the reaction is conducted for about 1.5 h, about 2 h, about 3 h, about 4 h, about 4.5 h, or about 5 h. Optionally, during the first coating, a reaction time of the reaction may be any value in the above respective range.

Optionally, during the first coating, the pH of the solution is controlled at 4 to 6. Optionally, during the first coating, the system is heated to about 55° C., about 60° C., about 70° C., about 80° C., about 90° C., about 100° C., about 110° C., or about 120° C. and kept at this temperature for about 2 h, about 3 h, about 4 h, about 5 h, about 6 h, about 7 h, about 8 h, about 9 h, or about 10 h; and optionally, during the first coating, the heating temperature and holding time may each be any value in the above respective range.

Optionally, during the first coating, the sintering may be conducted at about 650° C., about 700° C., about 750° C., or about 800° C. for about 2 h, about 3 h, about 4 h, about 5 h, or about 6 h; and optionally, the sintering temperature and sintering time may each be any value in the above respective range.

During the first coating, the control of the sintering temperature and time in the above respective range can avoid the following problems: if the sintering temperature is too low and the sintering time is too short during the first coating, the first coating layer will have a low crystallinity and include many amorphous substances, which affects an effect of inhibiting the metal dissolution, thereby affecting the cycling performance and high-temperature storage performance of the secondary battery; if the sintering temperature is too high, impurity phases will occur in the first coating layer, which also affects an effect of inhibiting the metal dissolution, thereby affecting the cycling and high-temperature storage performance of the secondary battery; and if the sintering time is too long, a thickness of the first coating layer will increase, which affects the migration of $Li^+$, thereby affecting the capacity per gram and rate performance of the material.

In some embodiments, during the second coating, after the element X source, the phosphorus source, and the acid are dissolved in the solvent, a resulting mixture is stirred to allow a reaction for 1 h to 10 h, then heated to 60° C. to 150° C. and kept at this temperature for 2 h to 10 h, and/or sintered at 500° C. to 700° C. for 6 h to 10 h.

Optionally, during the second coating, the reaction is fully conducted. Optionally, during the second coating, the reaction is conducted for about 1.5 h, about 2 h, about 3 h, about 4 h, about 4.5 h, about 5 h, about 6 h, about 7 h, about 8 h, about 9 h, or about 10 h. Optionally, during the second coating, a reaction time of the reaction may be any value in the above respective range.

Optionally, during the second coating, the mixture is heated to about 65° C., about 70° C., about 80° C., about 90° C., about 100° C., about 110° C., about 120° C., about 130° C., about 140° C., or about 150° C. and kept at this temperature for about 2 h, about 3 h, about 4 h, about 5 h, about 6 h, about 7 h, about 8 h, about 9 h, or about 10 h; and optionally, during the second coating, the heating temperature and holding time may each be any value in the above respective range.

During the preparation of the core material, the first coating, and the second coating, before sintering, namely, in the preparation of the core material (steps (1) and (2)) where a chemical reaction occurs and the preparation of the first coating layer suspension and the second coating layer suspension, the selection of an appropriate reaction temperature and time as described above can avoid the following problems: if a reaction temperature is too low, a reaction cannot occur or a reaction rate is low; if a temperature is too high, a product is decomposed or an impurity phase is produced; if a reaction time is too long, a product has a large particle size, which may increase the time and difficulty of a subsequent process; and if a reaction time is too short, a reaction is incomplete and only a small amount of a product can be obtained.

Optionally, during the second coating, the sintering may be conducted at about 550° C., about 600° C., or about 700° C. for about 6 h, about 7 h, about 8 h, about 9 h, or about 10 h; and optionally, the sintering temperature and sintering time may each be any value in the above respective range.

During the second coating, the control of the sintering temperature and time in the above respective range can avoid the following problems: if the sintering temperature is too low and the sintering time is too short during the second coating, the second coating layer will have a low crystallinity and include many amorphous substances, which reduces the reactivity of the surface of the material, thereby affecting the cycling and high-temperature storage performance of the secondary battery; if the sintering temperature is too high, impurity phases will occur in the second coating layer, which also reduces the reactivity of the surface of the material, thereby affecting the cycling and high-temperature storage performance of the secondary battery; and if the sintering time is too long, a thickness of the second coating layer will increase, which affects a voltage plateau of the material, thereby reducing the energy density of the material.

In some embodiments, the sintering during the third coating is conducted at 700° C. to 800° C. for 6 h to 10 h. Optionally, during the third coating, the sintering may be conducted at about 700° C., about 750° C., or about 800° C. for about 6 h, about 7 h, about 8 h, about 9 h, or about 10 h; and optionally, the sintering temperature and sintering time may each be any value in the above respective range.

During the third coating, the control of the sintering temperature and time in the above respective range can avoid the following problems: if the sintering temperature during the third coating is too low, a graphitization degree of the third coating layer will decrease, which affects the electronic conductivity of the material, thereby affecting the capacity per gram of the material; if the sintering temperature is too high, a graphitization degree of the third coating layer will be too high, which affects the transport of $Li^+$, thereby affecting the capacity per gram of the material; if the sintering time is too short, the third coating layer will be too thin, which affects the electronic conductivity of the material, thereby affecting the capacity per gram of the material; and if the sintering time is too long, the third coating layer will be too thick, which affects the compacted density of the material.

During each of the first coating, the second coating, and the third coating, the drying is conducted at 100° C. to 200° C., optionally 110° C. to 190° C., more optionally 120° C. to 180° C., further more optionally 120° C. to 170° C., and most optionally 120° C. to 160° C.; and the drying is conducted for 3 h to 9 h, optionally 4 h to 8 h, more optionally 5 h to 7 h, and most optionally about 6 h.

After being cycled, a secondary battery prepared from a cathode active material prepared by the preparation method of the cathode active material in the present application shows decreased dissolution of Mn and an element doped at a Mn position and improved high-temperature stability, high-temperature cycling performance, and rate performance. In addition, the preparation method of the cathode active material involves widely-available raw materials, a low cost, and a simple process, which is conducive to industrialization. In any embodiment, a surface oxygen valence state of the cathode active material with the core-shell structure is −1.90 or less and is optionally −1.90 to −1.98. The control of the surface oxygen valence state of the cathode active material in the above range can further reduce the interfacial side reactions between the cathode material and the electrolyte, thereby improving the cycling performance and gas production performance during high-temperature storage of a battery cell. In some embodiments, the positive electrode film layer may further include another cathode active material for a secondary battery well known in the prior art. For example, the cathode active material may include at least one selected from the group consisting of the following materials: a lithium-containing phosphate with an olivine structure, a lithium transition metal oxide, and modified compounds thereof. However, the present application is not limited to these materials, and another conventional material that can be used as a cathode active material for the secondary battery may also be adopted. These cathode active materials can be used alone or in combination. An example of the lithium transition metal oxide may include, but is not limited to, at least one selected from the group consisting of a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, and modified compounds thereof. An example of the lithium-containing phosphate with an olivine structure may include, but is not limited to, LFP (such as $LiFePO_4$), a composite of LFP and carbon, LMP (such as $LiMnPO_4$), a composite of LMP and carbon, lithium manganese iron phosphate (LMFP), and a composite of LMFP and carbon.

In some embodiments, the positive electrode film layer may further optionally include a binder. For example, the binder may include at least one selected from the group consisting of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluoroacrylate resin.

In some embodiments, the positive electrode film layer may further optionally include a conductive agent. For example, the conductive agent may include at least one selected from the group consisting of superconducting carbon, acetylene black, carbon black, Ketjenblack, a carbon dot, a carbon nanotube (CNT), graphene, and a carbon nanofiber (CNF).

In some embodiments, the positive electrode sheet may be prepared by the following method: the components for preparation of the positive electrode sheet described above, such as the cathode active material, the conductive agent, the binder, and any other components, are dispersed in a solvent (such as N-methylpyrrolidone (NMP)) to obtain a slurry, then the slurry is coated on a positive electrode current collector, and a resulting product is oven-dried and cold-pressed to obtain the positive electrode sheet.

[Negative Electrode Sheet]

The negative electrode sheet includes a negative electrode current collector and a negative electrode film layer arranged on at least one surface of the negative electrode current collector, and the negative electrode film layer includes an anode active material.

For example, the negative electrode current collector has two surfaces opposite each other in a thickness direction of the negative electrode current collector, and the negative electrode film layer is arranged on either or both of the two opposite surfaces of the negative electrode current collector.

In some embodiments, the negative electrode current collector may be a metal foil or a composite current collector. For example, the metal foil may be a copper foil. The composite current collector may include a polymer material base layer and a metal layer formed on at least one surface of the polymer material base layer. The composite current collector can be prepared by coating a metal material (such as copper, a copper alloy, nickel, a nickel alloy, titanium, a titanium alloy, silver, and a silver alloy) on a polymer material substrate (such as PP, PET, PBT, PS, and PE).

In some embodiments, the anode active material may be an anode active material for a battery well known in the prior art. For example, the anode active material may include at least one selected from the group consisting of the following materials: artificial graphite, natural graphite, soft carbon, hard carbon, a silicon-based material, a tin-based material, and lithium titanate. The silicon-based material can be at least one selected from the group consisting of elementary silicon, silicon oxide, a silicon-carbon composite, a silicon-nitrogen composite, and a silicon alloy. The tin-based material can be at least one selected from the group consisting of elementary tin, a tin oxide, and a tin alloy. However, the present application is not limited to these materials, and another conventional material that can be used as an anode active material for the battery may also be adopted. These anode active materials can be used alone or in combination.

In some embodiments, the negative electrode film layer may further optionally include a binder. For example, the binder may be at least one selected from the group consisting of a styrene-butadiene rubber (SBR), polyacrylic acid (PAA), polyacrylic acid sodium (PAAS), polyacrylamide (PAM), PVA, sodium alginate (SA), polymethylacrylic acid (PMAA), and carboxymethyl chitosan (CMCS).

In some embodiments, the negative electrode film layer may further optionally include a conductive agent. For example, the conductive agent may be at least one selected from the group consisting of superconducting carbon, acetylene black, carbon black, Ketjenblack, a carbon dot, a CNT, graphene, and a CNF.

In some embodiments, the negative electrode film layer may further optionally include another additive, such as a thickening agent (such as sodium carboxymethyl cellulose (CMC-Na)).

In some embodiments, the negative electrode sheet may be prepared by the following method: the components for preparation of the negative electrode sheet described above, such as the anode active material, the conductive agent, the binder, and any other components, are dispersed in a solvent (such as deionized water) to obtain a slurry, then the slurry is coated on a negative electrode current collector, and a resulting product is oven-dried and cold-pressed to obtain the negative electrode sheet.

[Separator]

In some embodiments, the secondary battery further includes a separator. The present application does not have a specified limitation on a type of the separator, and any well-known porous separator with excellent chemical stability and mechanical stability can be adopted.

In some embodiments, a material of the separator may be at least one selected from the group consisting of a glass fiber, a non-woven fabric, PE, PP, and PVDF. The separator can be a single-layer film or a multi-layer composite film, which is not particularly limited. When the separator is a multi-layer composite film, materials of multiple layers can be the same or different, which is not particularly limited.

In some embodiments, the positive electrode sheet, the negative electrode sheet, and the separator may be assembled into an electrode assembly by a winding or laminating process.

In some embodiments, the secondary battery may include an outer packaging, and the outer packaging can be configured to package the electrode assembly and the electrolyte.

In some embodiments, the outer packaging of the secondary battery may be a hard housing, such as a hard plastic housing, an aluminum housing, and a steel housing. The outer packaging of the secondary battery can also be a soft packaging, such as a pouch soft packaging. A material of the soft packaging can be a plastic, such as PP, PBT, and polybutylene succinate (PBS).

The present application does not have a specified limitation on a shape of the secondary battery, and the secondary battery may be in a cylindrical shape, a square shape, or any other shape. For example, FIG. 1 shows a secondary battery 5 in a square structure as an example.

Figure 2:
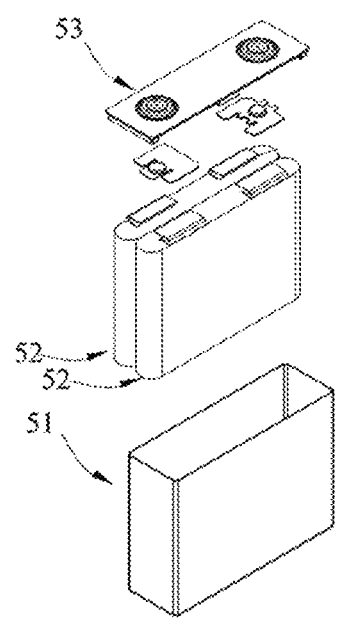
FIG. 2 is an exploded view of the secondary battery in the embodiment of the present application shown in FIG. 1.

In some embodiments, as shown in FIG. 2, the outer packaging may include a housing 51 and a cover plate 53. The housing 51 may include a bottom plate and a side plate connected to the bottom plate, where the bottom plate and the side plate enclose a holding cavity. The housing 51 has an opening communicating with the holding cavity, and the cover plate 53 may cover the opening to close the holding cavity. The positive electrode sheet, the negative electrode sheet, and the separator may be assembled into an electrode assembly 52 by a winding or laminating process. The electrode assembly 52 is packaged in the holding cavity. The electrode assembly 52 is soaked in the electrolyte. The secondary battery 5 may include one or more electrode assemblies 52, and a number of the electrode assemblies can be determined by those skilled in the art according to specific actual needs.

In some embodiments, the secondary battery may be assembled into a battery module; and the battery module may include one or more secondary batteries, and a specific number of the secondary batteries can be determined by those skilled in the art according to an application and capacity of the battery module.

Figure 3:
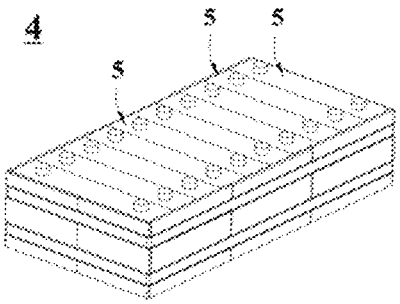
FIG. 3 is a schematic diagram of a battery module in an embodiment of the present application.

FIG. 3 shows a battery module 4 as an example. As shown in FIG. 3, in the battery module 4, a plurality of secondary batteries 5 may be arranged sequentially along a length of the battery module 4, and of course, the plurality of secondary batteries can also be arranged in any other manner. Further, the plurality of secondary batteries 5 can be fixed by fasteners.

Optionally, the battery module 4 may further include a housing with a holding space, and a plurality of secondary batteries 5 are accommodated in the holding space.

In some embodiments, the battery module may also be assembled into a battery pack; and the battery pack includes one or more battery modules, and a specific number of the battery modules can be determined by those skilled in the art according to an application and capacity of the battery pack.

Figure 4:
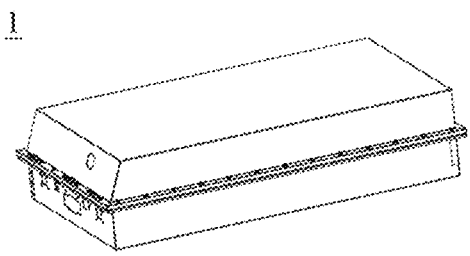
FIG. 4 is a schematic diagram of a battery pack in an embodiment of the present application.
Figure 5:
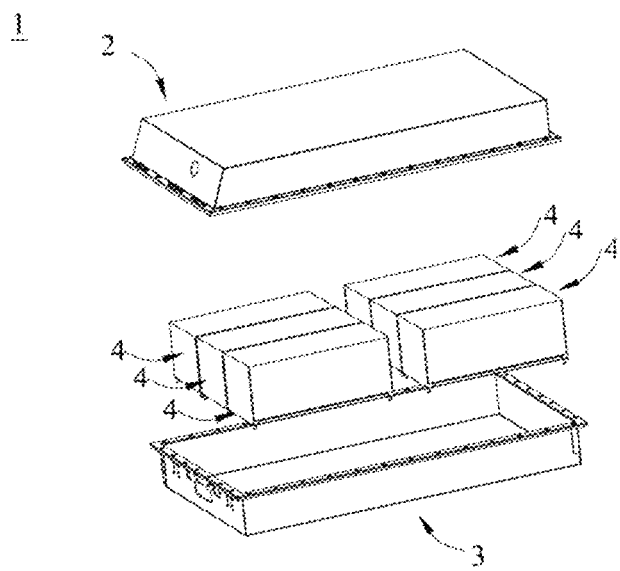
FIG. 5 is an exploded view of the battery pack in the embodiment of the present application shown in FIG. 4.

FIG. 4 and FIG. 5 each show a battery pack 1 as an example. As shown in FIG. 4 and FIG. 5, the battery pack 1 may include a battery case and a plurality of battery modules 4 arranged in the battery case. The battery case includes an upper case 2 and a lower case 3, and the upper case 2 can cover the lower case 3 to form an enclosed space for accommodating the battery modules 4. The plurality of battery modules 4 may be arranged in any way in the battery case.

Further, the present application also provides an electric device including at least one selected from the group consisting of the secondary battery, the battery module, and the battery pack provided in the present application. The secondary battery, the battery module, or the battery pack may be used as a power supply for the electric device, and may also be used as an energy storage unit for the electric device. The electric device may include a mobile device (such as a mobile phone and a laptop), an electric vehicle (such as a pure electric vehicle, a hybrid electric vehicle, a plug-in hybrid electric vehicle (PHEV), an electric bicycle, an electric scooter, an electric golf cart, and an electric truck), an electric train, a ship, a satellite system, and an energy storage system, but is not limited to.

For the electric device, the secondary battery, the battery module, or the battery pack can be selected according to use needs.

Figure 6:
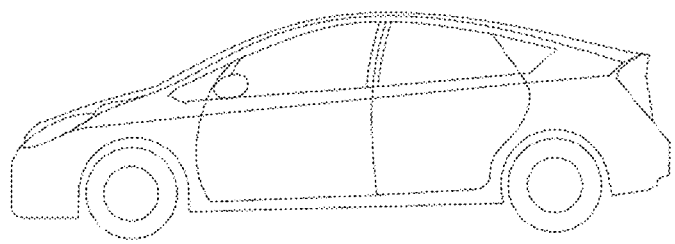
FIG. 6 is a schematic diagram of an electric device with a secondary battery in an embodiment of the present application as a power supply.

FIG. 6 shows an electric device as an example. The electric device is a pure electric vehicle, a hybrid electric vehicle, or a PHEV. In order to meet the needs of the electric device for high power and high energy density of a secondary battery, the battery pack or the battery module can be adopted.

EXAMPLES

The examples of the present application are described below. The examples described below are exemplary and only intended to explain the present application, but should not be construed as a limitation to the present application. If specific techniques or conditions are not indicated in an example, a process is conducted in accordance with the techniques or conditions described in literatures in the prior art or in accordance with a product specification. All of the used reagents or instruments which are not specified with manufacturers are conventional commercially-available products.

The first additive is selected from the group consisting of the following compounds:

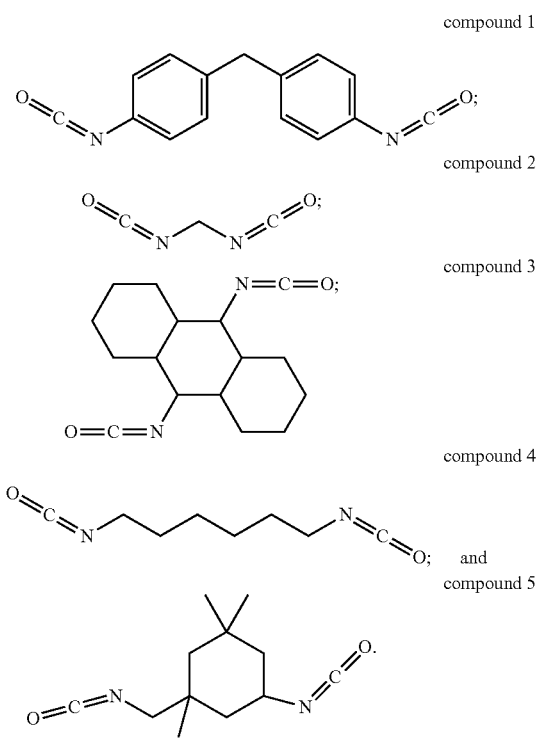

compound 1 compound 2 compound 3 compound 4 compound 5

I. Battery Preparation

Example 1

Step 1: Preparation of a Cathode Active Material
S1: Preparation of Manganese Oxalate Co-Doped with Fe, Co, V, and S
689.6 g of manganese carbonate, 455.27 g of ferrous carbonate, 4.65 g of cobalt sulfate, and 4.87 g of vanadium dichloride were added to a mixer and thoroughly mixed for 6 h; then a resulting mixture was transferred into a reactor, 5 L of deionized water and 1,260.6 g of oxalic acid dihydrate were added, and a resulting system was heated to 80° C. and thoroughly stirred at a rotational speed of 500 rpm for 6 h to allow a reaction until no bubble was generated to obtain a suspension of manganese oxalate co-doped with Fe, Co, and V; and the suspension was filtered, and a resulting filter residue was oven-dried at 120° C. and then sand-milled to obtain a manganese oxalate particle with a particle size of 100 nm.

S2: Preparation of a core $Li_{0.997}Mn_{0.60}Fe_{0.393}V_{0.004}Co_{0.003}P_{0.997}S_{0.003}O_4$ 1,793.1 g of the manganese oxalate prepared in S1, 368.3 g of lithium carbonate, 1,146.6 g of MAP, and 4.9 g of dilute sulfuric acid were added to 20 L of deionized water, and a resulting mixture was thoroughly stirred to allow a reaction at 80° C. for 10 h to obtain a slurry; the slurry was transferred to a spray-drying device and subjected to spray-drying granulation, and a resulting material was dried at 250° C. to obtain a powder; and the powder was sintered in a roller kiln for 4 h at 700° C. under a protective atmosphere (90% of nitrogen and 10% of hydrogen) to obtain the core material.

S3: Preparation of a First Coating Layer Suspension

Preparation of a $Li_2FeP_2O_7$ solution: 7.4 g of lithium carbonate, 11.6 g of ferrous carbonate, 23.0 g of MAP, and 12.6 g of oxalic acid dihydrate were dissolved in 500 mL of deionized water, a pH was controlled at 5, a resulting system was stirred to allow a reaction at room temperature for 2 h to obtain a solution, and then the solution was heated to 80° C. and kept at this temperature for 4 h to obtain the first coating layer suspension.

S4: Coating of a First Coating Layer 1,571.9 g of the doped LMP core material obtained in S2 was added to the first coating layer suspension (with a coating substance content of 15.7 g) obtained in S3, and a resulting mixture was thoroughly stirred for 6 h, then dried in a 120° C. oven for 6 h, and then sintered at 650° C. for 6 h to obtain a pyrophosphate-coated material.

S5: Preparation of a Second Coating Layer Suspension 3.7 g of lithium carbonate, 11.6 g of ferrous carbonate, 11.5 g of MAP, and 12.6 g of oxalic acid dihydrate were dissolved in 1,500 mL of deionized water, a resulting system was stirred to allow a reaction for 6 h to obtain a solution, and then the solution was heated to 120° C. and kept at this temperature for 6 h to obtain the second coating layer suspension.

S6: Coating of a Second Coating Layer 1,586.8 g of the pyrophosphate-coated material obtained in S4 was added to the second coating layer suspension (with a coating substance content of 47.1 g) obtained in S5, and a resulting mixture was thoroughly stirred for 6 h, then dried in a 120° C. oven for 6 h, and then sintered at 700° C. for 8 h to obtain a material coated with two coating layers.

S7: Preparation of a Third Coating Layer Aqueous Solution 37.3 g of sucrose was dissolved in 500 g of deionized water, and a resulting solution was stirred for thorough dissolution to obtain a sucrose aqueous solution.

S8: Coating of a Third Coating Layer 1,633.9 g of the material coated with two coating layers obtained in S6 was added to the sucrose aqueous solution obtained in S7, and a resulting mixture was thoroughly stirred for 6 h, then dried in a 150° C. oven for 6 h, and then sintered at 700° C. for 10 h to obtain a material coated with three coating layers.

Step 2: Preparation of a Positive Electrode Sheet

The cathode active material with three coating layers prepared above, acetylene black (a conductive agent), and PVDF (a binder) were added in a weight ratio of 97.0:1.2:1.8 to NMP, and a resulting mixture was thoroughly stirred to obtain a slurry; and then the slurry was evenly coated on an aluminum foil at 0.280 g/1,540.25 mm², and a resulting product was oven-dried, cold-pressed, and cut to obtain the positive electrode sheet.

Step 3: Preparation of a Negative Electrode Sheet

Artificial graphite (an anode active material), hard carbon, acetylene black (a conductive agent), SBR (a binder), and CMC-Na (thickening agent) were taken according to a weight ratio of 90:5:2:2:1 and dissolved in deionized water (a solvent), and a resulting solution was thoroughly stirred to obtain a slurry; and the slurry was evenly coated on a copper foil (a negative electrode current collector) at 0.117 g/1,540.25 mm², and a resulting product was oven-dried, cold-pressed, and cut to obtain the negative electrode sheet.

Step 4: Preparation of an Electrolyte

In a glove box with an argon atmosphere ($H_2O<0.1$ ppm, $O_2<0.1$ ppm), the organic solvents EC and EMC were thoroughly mixed according to a volume ratio of 3/7, then a compound 1 (a first additive, a mass content of the first additive in the electrolyte was 1%), $LiN(CF_3SO_2)(FSO_2)$ (a first lithium salt, a mass content of the first lithium salt in the electrolyte was 10%), and $LiPF_6$ (a second lithium salt, a mass content of the second lithium salt in the electrolyte was 1%) were added, and a resulting mixture was thoroughly stirred to obtain the electrolyte.

Step 5: Preparation of a Separator

A commercially-available PP-PE copolymer microporous film with a thickness of 20 μm and an average pore size of 80 nm (from Zhuo Gao Electronic Technology Company, model 20) was adopted.

Step 6: Preparation of a Total Battery

The positive electrode sheet, the separator, and the negative electrode sheet obtained above were stacked sequentially with the separator located between the positive and negative electrode sheets for isolation, and a resulting product was wound to obtain a bare battery cell; and the bare battery cell was placed in an outer packaging, the electrolyte was injected, and a resulting product was sealed to obtain the total battery.

[Preparation of a Button Battery]

The cathode active material prepared above, PVDF, and acetylene black were added in a weight ratio of 90:5:5 to NMP, and a resulting mixture was stirred in a drying shed to obtain a slurry; and the slurry was coated on an aluminum foil, and a resulting product was dried and cold-pressed to obtain a positive electrode sheet, with a coating amount of 0.2 g/cm² and a compacted density of 2.0 g/cm³.

With a lithium sheet as a negative electrode sheet and a solution of a compound 1 (a first additive, a mass content of the first additive in an electrolyte was 1%), $Li(FSO_2)_2N$ (a first lithium salt, a mass content of the first lithium salt in an electrolyte was 15%), and $LiPF_6$ (a second lithium salt, a mass content of the second lithium salt in an electrolyte was 3%) in a mixed solvent of EC, DEC, and DMC in a volume ratio of 1:1:1 as an electrolyte, the positive electrode sheet prepared above was used to assemble a button battery (hereinafter also referred to as "button battery") in a button battery cabinet.

Examples 2 to 29 and Comparative Examples 1 to 3

The cathode active materials and batteries in Examples 2 to 29 and Comparative Examples 1 to 3 each were prepared by a similar method to Example 1, and differences in the preparation of the cathode active materials were shown in Tables 1 to 6, where in Comparative Examples 2 and 3, the first coating layer was not coated, and thus there were no S3 and S4; and in Comparative Example 1, the second coating layer was not coated, and thus there were no S5 to S6.

Notes: In all examples and comparative examples of the present application, if not indicated, the first coating material and/or the second coating material used are/is assumed to be crystalline.

TABLE 1

Raw materials for preparation of cores

| No. | Core | Raw materials used in S1 | Raw materials used in S2 |
|---|---|---|---|
| Comparative Example 1 | $LiMn_{0.80}Fe_{0.20}PO_4$ | Manganese carbonate: 919.4 g; ferrous carbonate: 231.7 g; water: 5 L; and oxalic acid dihydrate: 1,260.6 g | Manganese iron oxalate dihydrate obtained in S1 (based on $C_2O_4Mn_{0.80}Fe_{0.20} \cdot 2H_2O$): 1,791.4 g; lithium carbonate: 369.4 g; MAP: 1,150.1 g; and water: 20 L |
| Comparative Example 2 | $LiMn_{0.70}Fe_{0.295}V_{0.005}PO_4$ | Manganese carbonate: 804.5 g; ferrous carbonate: 341.8 g; vanadium dichloride: 6.1 g; water: 5 L; and oxalic acid dihydrate: 1,260.6 g | Manganese iron vanadium oxalate dihydrate obtained in S1 (based on $C_2O_4Mn_{0.70}Fe_{0.295}V_{0.005} \cdot 2H_2O$): 1,792.0 g; lithium carbonate: 369.4 g; MAP: 1,150.1 g; and water: 20 L |
| Comparative Example 3 | $Li_{0.997}Mn_{0.60}Fe_{0.393}V_{0.004}Co_{0.003}P_{0.997}S_{0.003}O_4$ | Manganese carbonate: 689.6 g; ferrous carbonate: 455.3 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.60}Fe_{0.393}V_{0.004}Co_{0.003} \cdot 2H_2O$): 1,793.1 g; lithium carbonate: 368.3 g; MAP: 1,146.6 g; dilute sulfuric acid: 4.9 g; and water: 20 L |
| Example 11 | $Li_{1.001}Mn_{0.60}Fe_{0.393}V_{0.004}Co_{0.003}P_{0.999}Si_{0.001}O_4$ | Manganese carbonate: 689.6 g; ferrous carbonate: 455.3 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.60}Fe_{0.393}V_{0.004}Co_{0.003} \cdot 2H_2O$): 1,793.1 g; lithium carbonate: 369.8 g; MAP: 1,148.9 g; nisilicic acid: 0.8 g; and water: 20 L |
| Example 12 | $LiMn_{0.60}Fe_{0.393}V_{0.004}Co_{0.003}P_{0.998}N_{0.002}O_4$ | Manganese carbonate: 689.6 g; ferrous carbonate: 455.3 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.60}Fe_{0.393}V_{0.004}Co_{0.003} \cdot 2H_2O$): 1,793.1 g; lithium carbonate: 369.4 g; MAP: 1,147.8 g; dilute nitric acid: 2.7 g; and water: 20 L |
| Example 13 | $Li_{0.995}Mn_{0.65}Fe_{0.341}V_{0.004}Co_{0.005}P_{0.995}S_{0.005}O_4$ | Manganese carbonate: 747.1 g; ferrous carbonate: 395.1 g; cobalt sulfate: 7.8 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.65}Fe_{0.341}V_{0.004}Co_{0.005} \cdot 2H_2O$): 1792.7 g; lithium carbonate: 367.6 g; MAP: 1144.3 g; dilute sulfuric acid: 8.2 g; and water: 20 L |
| Example 14 | $Li_{1.002}Mn_{0.70}Fe_{0.293}V_{0.004}Co_{0.003}P_{0.998}Si_{0.002}O_4$ | Manganese carbonate: 804.6 g; ferrous carbonate: 339.5 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.70}Fe_{0.293}V_{0.004}Co_{0.003} \cdot 2H_2O$): 1,792.2 g; lithium carbonate: 370.2 g; MAP: 1,147.8 g; nisilicic acid: 1.6 g; and water: 20 L |
| Examples 15 and 17 | $LiMn_{0.60}Fe_{0.393}V_{0.004}Co_{0.003}P_{0.999}N_{0.001}O_4$ | Manganese carbonate: 689.6 g; ferrous carbonate: 455.3 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.60}Fe_{0.393}V_{0.004}Co_{0.003} \cdot 2H_2O$): 1,793.1 g; lithium carbonate: 369.4 g; MAP: 1,148.9 g; dilute nitric acid: 1.4 g; and water: 20 L |

TABLE 1-continued

Raw materials for preparation of cores

| No. | Core | Raw materials used in S1 | Raw materials used in S2 |
|---|---|---|---|
| Example 16 | $Li_{0.997}Mn_{0.60}Fe_{0.393}V_{0.004}Co_{0.003}P_{0.997}S_{0.003}O_4$ | Manganese carbonate: 689.6 g; ferrous carbonate: 455.3 g; cobalt sulfate: 4.7 g; vanadium dichloride: 4.9 g; water: 5 L; and oxalic acid dihydrate: 1,260.6 g | Manganese iron vanadium cobalt oxalate dihydrate obtained in S1 (based on $C_2O_4Mn_{0.60}Fe_{0.393}V_{0.004}Co_{0.003} \cdot 2H_2O$): 1,793.1 g; lithium carbonate: 368.7 g; MAP: 1,146.6 g; dilute sulfuric acid: 4.9 g; and water: 20 L |
| Example 18 | $LiMn_{0.60}Fe_{0.393}V_{0.004}Mg_{0.003}P_{0.995}N_{0.005}O_4$ | Manganese carbonate: 689.6 g; ferrous carbonate: 455.3 g; magnesium carbonate: 2.5 g; vanadium dichloride: 4.9 g; water: 5 L; and oxalic acid dihydrate: 1,260.6 g | Manganese iron vanadium magnesium oxalate dihydrate obtained in S1 (based on $C_2O_4Mn_{0.60}Fe_{0.393}V_{0.004}Mg_{0.003} \cdot 2H_2O$): 1,791.1 g; lithium carbonate: 369.4 g; MAP: 1,144.3 g; dilute nitric acid: 7.0 g; and water: 20 L |
| Example 19 | $Li_{0.999}Mn_{0.60}Fe_{0.393}V_{0.004}Mg_{0.003}P_{0.999}S_{0.001}O_4$ | Manganese carbonate: 689.6 g; ferrous carbonate: 455.3 g; magnesium carbonate: 2.5 g; vanadium dichloride: 4.9 g; water: 5 L; and oxalic acid dihydrate: 1,260.6 g | Manganese iron vanadium magnesium oxalate dihydrate obtained in S1 (based on $C_2O_4Mn_{0.60}Fe_{0.393}V_{0.004}Mg_{0.003} \cdot 2H_2O$): 1,791.1 g; lithium carbonate: 369.0 g; MAP: 1,148.9 g; dilute sulfuric acid: 1.6 g; and water: 20 L |
| Example 20 | $Li_{0.998}Mn_{0.60}Fe_{0.393}V_{0.004}Ni_{0.003}P_{0.998}S_{0.002}O_4$ | Manganese carbonate: 689.6 g; ferrous carbonate: 455.3 g; nickel carbonate: 3.6 g; vanadium dichloride: 4.9 g; water: 5 L; and oxalic acid dihydrate: 1,260.6 g | Manganese iron vanadium nickel oxalate dihydrate obtained in S1 (based on $C_2O_4Mn_{0.60}Fe_{0.393}V_{0.004}Ni_{0.003} \cdot 2H_2O$): 1,792.2 g; lithium carbonate: 368.7 g; MAP: 1,147.8 g; dilute sulfuric acid: 3.2 g; and water: 20 L |
| Examples 21 to 24 | $Li_{1.001}Mn_{0.60}Fe_{0.393}V_{0.004}Ni_{0.003}P_{0.999}Si_{0.001}O_4$ | Manganese carbonate: 689.6 g; ferrous carbonate: 455.3 g; nickel carbonate: 3.6 g; vanadium dichloride: 4.9 g; water: 5 L; and oxalic acid dihydrate: 1,260.6 g | Manganese iron vanadium nickel oxalate dihydrate obtained in S1 (based on $C_2O_4Mn_{0.60}Fe_{0.393}V_{0.004}Ni_{0.003} \cdot 2H_2O$): 1,793.1 g; lithium carbonate: 369.8 g; MAP: 1,148.9 g; nisilicic acid: 0.8 g; and water: 20 L |
| Example 25 | $Li_{1.001}Mn_{0.50}Fe_{0.493}V_{0.004}Ni_{0.003}P_{0.999}Si_{0.001}O_4$ | Manganese carbonate: 574.7 g; ferrous carbonate: 571.2 g; nickel carbonate: 3.6 g; vanadium dichloride: 4.9 g; water: 5 L; and oxalic acid dihydrate: 1,260.6 g | Manganese iron vanadium nickel oxalate dihydrate obtained in S1 (based on $C_2O_4Mn_{0.50}Fe_{0.493}V_{0.004}Ni_{0.003} \cdot 2H_2O$): 1794.0 g; lithium carbonate: 369.8 g; MAP: 1,148.9 g; nisilicic acid: 0.8 g; and water: 20 L |
| Example 26 | $Li_{1.001}Mn_{0.999}Fe_{0.001}P_{0.999}Si_{0.001}O_4$ | Manganese carbonate: 1,148.2 g; ferrous carbonate: 1.2 g; water: 5 L; and oxalic acid dihydrate: 1,260.6 g | Manganese iron oxalate dihydrate obtained in S1 (based on $C_2O_4Mn_{0.999}Fe_{0.001} \cdot 2H_2O$): 1,789.6 g; lithium carbonate: 369.8 g; MAP: 1,148.9 g; nisilicic acid: 0.8 g; and water: 20 L |
| Example 27 | $LiMn_{0.60}Fe_{0.393}V_{0.004}Ni_{0.003}P_{0.9}N_{0.100}O_4$ | Manganese carbonate: 689.6 g; ferrous carbonate: 455.3 g; nickel carbonate: 3.6 g; vanadium dichloride: 4.9 g; water: 5 L; and oxalic acid dihydrate: 1,260.6 g | Manganese iron vanadium nickel oxalate dihydrate obtained in S1 (based on $C_2O_4Mn_{0.60}Fe_{0.393}V_{0.004}Ni_{0.003} \cdot 2H_2O$): 1,793.1 g; lithium carbonate: 369.4 g; MAP: 1,035.1 g; dilute nitric acid: 140.0 g; and water: 20 L |
| Example 28 | $Li_{1.001}Mn_{0.40}Fe_{0.593}V_{0.004}Ni_{0.003}P_{0.999}Si_{0.001}O_4$ | Manganese carbonate: 459.7 g; ferrous carbonate: 686.9 g; vanadium dichloride: 4.8 g; nickel carbonate: 3.6 g; water: 5 L; and oxalic acid dihydrate: 1,260.6 g | Manganese iron vanadium nickel oxalate dihydrate obtained in S1 (based on $C_2O_4Mn_{0.40}Fe_{0.593}V_{0.004}Ni_{0.003} \cdot 2H_2O$): 1794.9 g; lithium carbonate: 369.8 g; MAP: 1,148.9 g; nisilicic acid: 0.8 g; and water: 20 L |

TABLE 1-continued

Raw materials for preparation of cores

| No. | Core | Raw materials used in S1 | Raw materials used in S2 |
|---|---|---|---|
| Example 29 | $Li_{1.001}Mn_{0.40}Fe_{0.393}V_{0.204}Ni_{0.003}P_{0.999}Si_{0.001}O_4$ | Manganese carbonate: 459.7 g; ferrous carbonate: 455.2 g; vanadium dichloride: 248.6 g; nickel carbonate: 3.6 g; water: 5 L; and oxalic acid dihydrate: 1,260.6 g | Manganese iron vanadium nickel oxalate dihydrate obtained in S1 (based on $C_2O_4Mn_{0.40}Fe_{0.393}V_{0.204}Ni_{0.003} \cdot 2H_2O$): 1785.1 g; lithium carbonate: 369.8 g; MAP: 1,148.9 g; nisilicic acid: 0.8 g; and water: 20 L |

TABLE 2

Preparation of the first coating layer suspension (S3)

| No. | Coating substance for the first coating layer | Preparation of the first coating layer suspension |
|---|---|---|
| Comparative Example 1 | Amorphous $Li_2FeP_2O_7$ | Lithium carbonate: 7.4 g; ferrous carbonate: 11.6 g; MAP: 23.0 g; and oxalic acid dihydrate: 12.6 g, a pH is controlled at 5 |
| Comparative Examples 13 to 15 and 17 and Examples 1 to 14, 19, and 21 to 29 | Crystalline $Li_2FeP_2O_7$ | Lithium carbonate: 7.4 g; ferrous carbonate: 11.6 g; MAP: 23.0 g; and oxalic acid dihydrate: 12.6 g, a pH is controlled at 5 |
| Examples 15 and 16 | Crystalline $Al_4(P_2O_7)_3$ | Aluminum chloride: 53.3 g; MAP: 34.5 g; and oxalic acid dihydrate: 18.9 g, a pH is controlled at 4 |
| Examples 17 and 18 and 20 | Crystalline $Li_2NiP_2O_7$ | Lithium carbonate: 7.4 g; nickel carbonate: 11.9 g; MAP: 23.0 g; and oxalic acid dihydrate: 12.6 g, a pH is controlled at 5 |

TABLE 3

Coating of the first coating layer (S4)

| No. | Coating substance for the first coating layer and an amount thereof (based on a weight of the core) | Amount of the core added in S4 | Amount of a corresponding coating substance in the first coating layer suspension | Mixing time (h) | Oven-drying temperature (°C.) | Sintering temperature (°C.) | Sintering time (h) |
|---|---|---|---|---|---|---|---|
| Comparative Example 1 | 2% amorphous $Li_2FeP_2O_7$ | 1570.4 g | 31.4 g | 6 | 120 | 500 | 4 |
| Examples 1 to 4 and 8 to 10 | 1% $Li_2FeP_2O_7$ | 1571.9 g | 15.7 g | 6 | 120 | 650 | 6 |
| Example 5 | 2% $Li_2FeP_2O_7$ | 1571.9 g | 31.4 g | 6 | 120 | 650 | 6 |
| Example 6 | 3% $Li_2FeP_2O_7$ | 1571.1 g | 47.1 g | 6 | 120 | 650 | 6 |
| Example 7 | 5% $Li_2FeP_2O_7$ | 1571.9 g | 78.6 g | 6 | 120 | 650 | 6 |
| Example 11 | 1% $Li_2FeP_2O_7$ | 1572.1 g | 15.7 g | 6 | 120 | 650 | 6 |
| Example 12 | 1% $Li_2FeP_2O_7$ | 1571.7 g | 15.7 g | 6 | 120 | 650 | 6 |
| Example 13 | 2% $Li_2FeP_2O_7$ | 1571.4 g | 31.4 g | 6 | 120 | 650 | 6 |
| Example 14 | 2.5% $Li_2FeP_2O_7$ | 1571.9 g | 39.3 g | 6 | 120 | 650 | 6 |

TABLE 3-continued

Coating of the first coating layer (S4)

| No. | Coating substance for the first coating layer and an amount thereof (based on a weight of the core) | Amount of the core added in S4 | Amount of a corresponding coating substance in the first coating layer suspension | Mixing time (h) | Oven-drying temperature (° C.) | Sintering temperature (° C.) | Sintering time (h) |
|---|---|---|---|---|---|---|---|
| Example 15 | 2% $Al_4(P_2O_7)_3$ | 1571.9 g | 31.4 g | 6 | 120 | 680 | 8 |
| Example 16 | 3% $Al_4(P_2O_7)_3$ | 1571.9 g | 47.2 g | 6 | 120 | 680 | 8 |
| Example 17 | 1.5% $Li_2NiP_2O_7$ | 1571.9 g | 23.6 g | 6 | 120 | 630 | 6 |
| Example 18 | 1% $Li_2NiP_2O_7$ | 1570.1 g | 15.7 g | 6 | 120 | 630 | 6 |
| Example 19 | 2% $Li_2FeP_2O_7$ | 1571.0 g | 31.4 g | 6 | 120 | 650 | 6 |
| Example 20 | 1% $Li_2NiP_2O_7$ | 1571.9 g | 15.7 g | 6 | 120 | 630 | 6 |
| Examples 21 to 24 | 2% $Li_2FeP_2O_7$ | 1572.1 g | 31.4 g | 6 | 120 | 650 | 6 |
| Example 22 | 5.50% $Li_2FeP_2O_7$ | 1572.1 g | 86.5 g | 6 | 120 | 650 | 6 |
| Example 25 | 1% $Li_2FeP_2O_7$ | 1573.0 g | 15.7 g | 6 | 120 | 650 | 6 |
| Example 26 | 1% $Li_2FeP_2O_7$ | 1568.6 g | 15.7 g | 6 | 120 | 650 | 6 |
| Example 27 | 1% $Li_2FeP_2O_7$ | 1569.2 g | 15.7 g | 6 | 120 | 650 | 6 |
| Example 28 | 2% crystalline $Li_2FeP_2O_7$ | 1573.9 g | 31.4 g | 6 | 120 | 650 | 6 |
| Example 29 | 2% crystalline $Li_2FeP_2O_7$ | 1564.1 g | 31.2 g | 6 | 120 | 650 | 6 |

TABLE 4

Preparation of the second coating layer suspension (S5)

| No. | Coating substance for the second coating layer | S5: Preparation of the second coating layer suspension |
|---|---|---|
| Comparative Example 3 and Examples 1 to 14, 18 to 19, and 25 to 27 | Crystalline $LiFePO_4$ | Lithium carbonate: 3.7 g; ferrous carbonate: 11.6 g; MAP: 11.5 g; and oxalic acid dihydrate: 12.6 g |
| Examples 15, 17, 20, 21 to 24, and 28 and 29 | Crystalline $LiCoPO_4$ | Lithium carbonate: 3.7 g; cobalt sulfate: 15.5 g; MAP: 11.5 g; and oxalic acid dihydrate: 12.6 g |
| Example 16 | Crystalline $LiNiPO_4$ | Lithium carbonate: 3.7 g; nickel carbonate: 11.9 g; MAP: 11.5 g; and oxalic acid dihydrate: 12.6 g |

TABLE 5

| | | | Coating of the second coating layer (S6) | | | | |
|---|---|---|---|---|---|---|---|
| | Coating substance for the second coating layer and an amount thereof (based on a weight of the core) | Amount of the pyrophosphate-coated material added in S6 (where it is an amount of the added core in Comparative Example 12) (g) | S6: Coating of the second coating layer | | | | |
| No. | | | Amount of a corresponding coating substance in the second coating layer suspension (g) | Mixing time (h) | Oven-drying temperature (° C.) | Sintering temperature (° C.) | Sintering time (h) |
| Comparative Example 3 | 3% LiFePO$_4$ | 1571.1 | 47.1 | 6 | 120 | 700 | 8 |
| Examples 1 to 4 | 3% LiFePO$_4$ | 1586.8 | 47.1 | 6 | 120 | 700 | 8 |
| Example 5 | 3% LiFePO$_4$ | 1602.5 | 47.1 | 6 | 120 | 700 | 8 |
| Example 6 | 3% LiFePO$_4$ | 1618.2 | 47.1 | 6 | 120 | 700 | 8 |
| Example 7 | 3% LiFePO$_4$ | 1649.6 | 47.1 | 6 | 120 | 700 | 8 |
| Example 8 | 1% LiFePO$_4$ | 1586.8 | 15.7 | 6 | 120 | 700 | 8 |
| Example 9 | 4% LiFePO$_4$ | 1586.8 | 62.8 | 6 | 120 | 700 | 8 |
| Example 10 | 5% LiFePO$_4$ | 1586.8 | 78.6 | 6 | 120 | 700 | 8 |
| Example 11 | 2.50% LiFePO$_4$ | 1587.8 | 39.3 | 6 | 120 | 700 | 8 |
| Example 12 | 3% LiFePO$_4$ | 1587.4 | 47.2 | 6 | 120 | 700 | 8 |
| Example 13 | 2% LiFePO$_4$ | 1602.8 | 31.4 | 6 | 120 | 700 | 8 |
| Example 14 | 3.50% LiFePO$_4$ | 1610.5 | 55.0 | 6 | 120 | 700 | 8 |
| Example 15 | 2.5% LiCoPO$_4$ | 1603.3 | 39.3 | 6 | 120 | 750 | 8 |
| Example 16 | 3% LiNiPO$_4$ | 1619.0 | 47.2 | 6 | 120 | 680 | 8 |
| Example 17 | 2.5% LiCoPO$_4$ | 1595.5 | 39.3 | 6 | 120 | 750 | 8 |
| Example 18 | 3% LiFePO$_4$ | 1585.9 | 47.1 | 6 | 120 | 700 | 8 |
| Example 19 | 4% LiFePO$_4$ | 1602.4 | 62.8 | 6 | 120 | 700 | 8 |
| Example 20 | 3% LiCoPO$_4$ | 1587.7 | 47.2 | 6 | 120 | 750 | 8 |
| Example 21 | 4% LiCoPO$_4$ | 1603.5 | 62.9 | 6 | 120 | 750 | 8 |
| Example 22 | 4% LiCoPO$_4$ | 1658.6 | 62.9 | 6 | 120 | 750 | 8 |
| Example 23 | 5.50% LiCoPO$_4$ | 1603.5 | 86.5 | 6 | 120 | 750 | 8 |
| Example 24 | 4% LiCoPO$_4$ | 1603.5 | 62.9 | 6 | 120 | 750 | 8 |
| Example 25 | 3% LiFePO$_4$ | 1588.7 | 47.2 | 6 | 120 | 700 | 8 |

TABLE 5-continued

Coating of the second coating layer (S6)

| No. | Coating substance for the second coating layer and an amount thereof (based on a weight of the core) | Amount of the pyrophosphate-coated material added in S6 (where it is an amount of the added core in Comparative Example 12) (g) | Amount of a corresponding coating substance in the second coating layer suspension (g) | S6: Coating of the second coating layer | | | |
|---|---|---|---|---|---|---|---|
| | | | | Mixing time (h) | Oven-drying temperature (° C.) | Sintering temperature (° C.) | Sintering time (h) |
| Example 26 | 3% LiFePO$_4$ | 1584.3 | 47.1 | 6 | 120 | 700 | 8 |
| Example 27 | 3% LiFePO$_4$ | 1584.9 | 47.1 | 6 | 120 | 700 | 8 |
| Example 28 | 4% LiCoPO$_4$ | 1605.4 | 63.0 | 6 | 120 | 750 | 8 |
| Example 29 | 4% LiCoPO$_4$ | 1605.4 | 63.0 | 6 | 120 | 750 | 8 |

TABLE 6

Coating of the third coating layer (S8)

| No. | Third coating layer | Molar ratio of SP2 to SP3 | Amount of the material coated with two coating layers added in S8 (where it is an amount of the added core in Comparative Examples 1 and 2 and 4 to 10 and it is an amount of the added material coated with the first coating layer in Comparative Example 11) (g) | Amount of sucrose (g) | S8: Coating of the third coating layer | | |
|---|---|---|---|---|---|---|---|
| | | | | | Mixing time (h) | Oven-drying temperature (° C.) | Sintering temperature (° C.) | Sintering time (h) |
| Comparative Example 1 | 2% carbon | 2.7 | 1601.8 | 74.6 | 6 | 150 | 680 | 7 |
| Comparative Example 2 | 1% carbon | 2.4 | 1571.0 | 37.3 | 6 | 150 | 630 | 8 |
| Comparative Example 3 | 1% carbon | 2.1 | 1618.2 | 37.3 | 6 | 150 | 600 | 6 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |

TABLE 6-continued

Coating of the third coating layer (S8)

| | Third coating layer | Molar ratio of SP2 to SP3 | Amount of the material coated with two coating layers added in S8 (where it is an amount of the added core in Comparative Examples 1 and 2 and 4 to 10 and it is an amount of the added material coated with the first coating layer in Comparative Example 11) (g) | Amount of sucrose (g) | Mixing time (h) | Oven-drying temperature (° C.) | Sintering temperature (° C.) | Sintering time (h) |
|---|---|---|---|---|---|---|---|---|
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% carbon | 2.4 | 1634.6 | 74.7 | 6 | 150 | 630 | 8 |
| Example 13 | 2% carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

II. Performance Evaluation

1. Lattice Change Rate Test Method:

In a constant-temperature environment of 25° C., a cathode active material sample was placed in an XRD instrument (model: Bruker D8 Discover) and tested at 1°/min, and test data were sorted and analyzed. With reference to a standard powder diffraction file (PDF) card, lattice constants a0, b0, c0, and v0 (a0, b0, and c0 represented lengths of a unit cell in all directions, respectively, and v0 represented a volume of a unit cell, which could be acquired directly through XRD refinement results) were calculated.

According to the preparation method of the button battery in the above example, the cathode active material sample was prepared into a button battery; the button battery was charged at a small rate of 0.05 C until a current was reduced to 0.01 C; a positive electrode sheet in the button battery was then taken out, soaked in DMC for 8 h, dried, and scraped to obtain a powder, and particles with a particle size of less than 500 nm in the powder were screened out; a sample was taken, a unit cell volume v1 of the sample was calculated in the same way as the fresh sample above; and a lattice change rate (unit cell volume change rate) before and after complete lithium deintercalation was calculated according to (v0−v1)/v0×100% and shown in a table.

2. Li/Mn Antisite Defect Concentration

XRD test results in the "Lattice change rate test method" were compared with a PDF card of a standard crystal to obtain a Li/Mn antisite defect concentration. Specifically, the XRD test results in the "Lattice change rate test method" were imported into the General Structure Analysis System (GSAS) software to automatically acquire refinement results including positions of different atoms, and the refinement results were read to obtain the Li/Mn antisite defect concentration.

3. Compacted Density 5 g of the cathode active material powder prepared above was taken and added to a special compaction mold (American CARVER mold, model: 13 mm), and then the mold was placed on a compacted density instrument; a pressure of 3 T was applied, and a thickness of the powder under the pressure (thickness after pressure relief) was read on the instrument; and the compacted density was calculated according to $\rho=m/v$, where an area value used was a standard small image area of 1,540.25 $mm^2$.

4. Constant Current Ratio of 3 C Charge

In a constant-temperature environment of 25° C., the total battery freshly prepared in each of the examples and comparative examples was allowed to stand for 5 min, then discharged at ⅓C to 2.5 V, allowed to stand for 5 min, charged at ⅓C to 4.3 V, then charged at a constant voltage of 4.3 V until a current was less than or equal to 0.05 mA, and then allowed to stand for 5 min, and a charge capacity C0 at this point was recorded; and the battery was discharged at ⅓C to 2.5 V, allowed to stand for 5 min, then charged at 3 C to 4.3 V, and allowed to stand for 5 min, and a charge capacity C1 at this point was recorded. The constant current ratio of 3 C charge was C1/C0×100%.

The higher the constant current ratio of 3 C charge, the better the rate performance of the secondary battery.

5. Dissolution Test for the Transition Metal Mn (and Fe Doped at a Mn Position).

After being cycled at 45° C. until a capacity was attenuated to 80%, a total battery prepared in each of the examples and comparative examples was discharged at a rate of 0.1 C to a cut-off voltage of 2.0 V; then the battery was disassembled, a negative electrode sheet was taken out, 30 discs each of a unit area (1,540.25 $mm^2$) were randomly taken from the negative electrode sheet, and an inductively coupled plasma (ICP) spectrum was tested with Agilent ICP-OES730; and according to ICP results, contents of Fe (if Fe was doped at a Mn position in the cathode active material) and Mn were calculated, such as to calculate an amount of dissolved Mn (and Fe doped at a Mn position) after cycling. A test standard was based on EPA-6010D-2014.

6. Surface Oxygen Valence State 5 g of the cathode active material sample prepared above was prepared into a button battery in accordance with the preparation method of the button battery in the above example; the button battery was charged at a small rate of 0.05 C until a current was reduced to 0.01 C; a positive electrode sheet in the button battery was then taken out and soaked in DMC for 8 h, dried, and scraped to obtain a powder, and particles with a particle size of less than 500 nm in the powder were screened out; the screened particles were tested by EELS (model: Talos F200S) to obtain an energy-loss near-edge structure (ELNES), which reflected the state density and energy level distribution of elements; and according to the state density and energy level distribution, a number of occupied electrons was calculated by integrating the valence band state density data, such as to calculate the surface oxygen valence state after charge.

7. Determination of Manganese and Phosphorus in the Cathode Active Material 5 g of the cathode active material prepared above was dissolved in 100 mL of Lefort aqua regia (concentrated hydrochloric acid:concentrated nitric acid=1:3) (concentrated hydrochloric acid concentration: about 37%, and concentrated nitric acid concentration: about 65%) to obtain a solution, a content of each element in the solution was tested by ICP, and then a content of manganese or phosphorus was measured and converted (amount of manganese or phosphorus/amount of the cathode active material*100%) to obtain a weight proportion of manganese or phosphorus.

8. Test Method of an Initial Capacity Per Gram of a Button Battery

At 2.5 V to 4.3 V, the button battery prepared in each of the examples and comparative examples was charged at 0.1 C to 4.3 V, then charged at a constant voltage of 4.3 V until a current was less than or equal to 0.05 mA, allowed to stand for 5 min, and then discharged at 0.1 C to 2.0 V, and a discharge capacity D0 at this point was recorded, which was the initial capacity per gram.

10. Battery Cell Expansion Test of a Total Battery During 30 d Storage at 60° C.

The total battery in a 100% state of charge (SOC) prepared in each of the examples and comparative examples was stored at 60° C.; and before and after the storage and during the storage, an open circuit voltage (OCV) and an alternating current internal resistance (IMP) of a battery cell were measured to monitor an SOC, and a volume of the battery cell was measured. The total battery was taken out every 48 h during storage, allowed to stand for 1 h and then tested for OCV and IMP, and then cooled to room temperature, and a volume of a battery cell was measured by a drainage method. In the drainage method, a gravity $F_1$ of a battery cell was first measured with a balance allowing automatic unit conversion of dial data; then the battery cell was completely immersed in deionized water (whose density was known to be 1 $g/cm^3$), a gravity $F_2$ of the battery cell at this point was measured, and a buoyant force $F_{float}$ for the battery cell was $F_1-F_2$; and according to the Archimedes' principle $F_{float}=\rho \times g \times V_{drainage}$, a volume V of the battery cell was calculated according to $V=(F_1-F_2)/(\rho \times g)$.

According to OCV and IMP test results, during this experiment, the batteries of all examples were always in an SOC of 99% or more until the end of storage.

After 30 d of storage, a volume of the battery cell was measured, and a percentage of a volume increase of the battery cell after the storage relative to a volume of the battery cell before the storage.

11. Cycling Performance Test of a Total Battery at 45° C.

In a constant-temperature environment of 45° C., at 2.5 V to 4.3 V, the total battery was charged at 1 C to 4.3 V, then charged at a constant voltage of 4.3 V until a current was less than or equal to 0.05 mA, allowed to stand for 5 min, and then discharged at 1 C to 2.5 V, and a capacity at this point was denoted as $D_n$(n=0, 1, 2, . . . ). The above process was repeated until a capacity was attenuated (fading) to 80%, and a number of repetitions was recorded, which was a number of cycles corresponding to a capacity retention of 80% at 45° C.

12. Interplanar Crystal Spacing and Angle Test 1 g of the cathode active material powder prepared above was taken and added to a 50 mL test tube, then 10 mL of 75% alcohol was injected into the test tube, and a resulting mixture was thoroughly stirred for 30 min; then an appropriate amount of a resulting solution was taken by a clean disposable plastic straw and added dropwise to a 300-mesh copper mesh, such that a part of the powder remained on the copper mesh; the copper mesh with the sample was transferred to a TEM (Talos F200s G2) sample cavity and tested to obtain an original TEM image, and the original TEM image (format: xx.dm3) was saved;

the original TEM image was opened in the DigitalMicrograph software and subjected to Fourier transformation (which was automatically completed by the software after clicking) to obtain a diffraction pattern; and a distance from a diffraction spot to a center position in the diffraction pattern was measured to obtain an interplanar crystal spacing, and an angle was calculated according to a Bragg equation.

The interplanar crystal spacing and corresponding angle data were compared with respective standard values to identify different substances of coating layers.

13. Coating Layer Thickness Test

A thickness of a coating layer was mainly tested as follows: a thin sheet with a thickness of about 100 nm was cut by FIB from a middle of a single particle of the cathode active material prepared above and then subjected to a TEM test to obtain an original TEM image, and the original TEM image (format: xx.dm3) was saved; and the original TEM image was opened in the DigitalMicrograph software, a coating layer was identified through the interplanar crystal spacing and angle information, and a thickness of the coating layer was measured.

Thicknesses at three positions of the selected particle were measured, and then an average was taken.

14. Determination of a Molar Ratio of SP2-Hybridized Carbon to SP3-Hybridized Carbon in a Third Coating Layer This test was conducted by Raman spectroscopy. An energy spectrum of a Raman test was subjected to peak differentiation to obtain Id/Ig (where Id represented a peak intensity of the SP3-hybridized carbon and Ig represented a peak intensity of the SP2-hybridized carbon), thereby determining the molar ratio of the two.

Performance test results of the examples and comparative examples were shown in the table below.

TABLE 7

Powder properties of the cathode active materials in Examples 1 to 29 and Comparative Examples 1 to 3 and performance of batteries prepared from the cathode active materials

| | Powder properties of a cathode active material | | | | | | Performance of a battery | | |
| --- | --- | --- | --- | --- | --- | --- | --- | --- | --- |
| No. | Lattice change rate (%) | Li/Mn antisite defect concentration (%) | Compacted density (g/cm$^3$) | Surface oxygen valence state | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
| Comparative Example 1 | 10.8 | 3.4 | 1.64 | −1.64 | 54 | 1642 | 146.3 | 39.4 | 401 |
| Comparative Example 2 | 4.3 | 2.8 | 1.69 | −1.82 | 59 | 1041 | 154.4 | 7.9 | 584 |
| Comparative Example 3 | 2.3 | 2.1 | 1.95 | −1.95 | 52 | 1957 | 127.6 | 45.7 | 196 |
| Example 1 | 2.5 | 1.8 | 2.35 | −1.93 | 73 | 7 | 159.6 | 3.9 | 1196 |
| Example 2 | 2.5 | 1.8 | 2.24 | −1.94 | 73 | 6 | 159.3 | 3.5 | 1328 |
| Example 3 | 2.5 | 1.8 | 2.22 | −1.94 | 73 | 5 | 157.7 | 3.2 | 1456 |
| Example 4 | 2.5 | 1.8 | 2.21 | −1.95 | 73 | 3 | 155.2 | 2.8 | 1490 |
| Example 5 | 2.5 | 1.8 | 2.33 | −1.93 | 73 | 5 | 158.7 | 2.8 | 1591 |
| Example 6 | 2.5 | 1.8 | 2.31 | −1.93 | 72 | 4 | 158.8 | 2.7 | 1671 |
| Example 7 | 2.5 | 1.8 | 2.28 | −1.93 | 71 | 3 | 158.1 | 2.4 | 1746 |
| Example 8 | 2.5 | 1.8 | 2.29 | −1.93 | 72 | 9 | 158.4 | 3.2 | 1121 |
| Example 9 | 2.5 | 1.8 | 2.46 | −1.98 | 76 | 6 | 159.1 | 2.6 | 1363 |
| Example 10 | 2.5 | 1.8 | 2.49 | −1.98 | 78 | 5 | 159.4 | 2.4 | 1575 |
| Example 11 | 2.6 | 1.9 | 2.38 | −1.97 | 75 | 6 | 158.8 | 3.2 | 1088 |
| Example 12 | 2.4 | 1.8 | 2.41 | −1.97 | 77 | 4 | 158.1 | 2.4 | 1204 |
| Example 13 | 2.7 | 1.9 | 2.42 | −1.97 | 78 | 5 | 158.8 | 3.3 | 1279 |

TABLE 7-continued

Powder properties of the cathode active materials in Examples 1 to 29 and Comparative Examples 1 to 3 and performance of batteries prepared from the cathode active materials

| | Powder properties of a cathode active material | | | | | Performance of a battery | | |
|---|---|---|---|---|---|---|---|---|
| No. | Lattice change rate (%) | Li/Mn antisite defect concentration (%) | Compacted density (g/cm$^3$) | Surface oxygen valence state | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
| Example 14 | 2.8 | 1.9 | 2.45 | −1.97 | 80 | 3 | 155.6 | 3.5 | 1386 |
| Example 15 | 2.2 | 1.9 | 2.46 | −1.97 | 77 | 3 | 155.8 | 3.4 | 1176 |
| Example 16 | 2.1 | 1.9 | 2.47 | −1.98 | 76 | 5 | 156.0 | 3.5 | 1200 |
| Example 17 | 2.5 | 1.7 | 2.41 | −1.98 | 78 | 4 | 157.5 | 4.2 | 1333 |
| Example 18 | 2.3 | 1.6 | 2.42 | −1.97 | 79 | 4 | 155.8 | 4.4 | 1461 |
| Example 19 | 2.2 | 1.7 | 2.43 | −1.97 | 80 | 4 | 156.5 | 4.5 | 1408 |
| Example 20 | 2.6 | 1.8 | 2.42 | −1.94 | 78 | 4 | 156.2 | 3.1 | 1545 |
| Example 21 | 2.4 | 1.7 | 2.41 | −1.97 | 79 | 4 | 156.8 | 3.2 | 1407 |
| Example 22 | 2.4 | 1.8 | 2.32 | −1.95 | 75 | 2 | 154.4 | 2.5 | 1649 |
| Example 23 | 2.3 | 1.7 | 2.46 | −1.96 | 79 | 3 | 154.1 | 2.3 | 1744 |
| Example 24 | 2.2 | 1.8 | 2.47 | −1.95 | 79 | 3 | 154.3 | 2.4 | 1641 |
| Example 25 | 2.1 | 1.7 | 2.49 | −1.98 | 82 | 3 | 160.6 | 2.6 | 1630 |
| Example 26 | 3.6 | 2.5 | 2.21 | −1.97 | 59 | 8 | 154.1 | 4.4 | 1078 |
| Example 27 | 2.8 | 2.1 | 2.24 | −1.98 | 77 | 6 | 158.1 | 3.5 | 1194 |
| Example 28 | 2.5 | 1.9 | 1.95 | −1.94 | 57 | 9 | 156.7 | 6.0 | 1045 |
| Example 29 | 2.4 | 1.8 | 1.98 | −1.95 | 71 | 7 | 157.8 | 4.2 | 1110 |

It can be seen from Table 7 that, compared with the comparative examples, the examples allow a smaller lattice change rate, a smaller Li/Mn antisite defect concentration, a larger compacted density, a surface oxygen valence state closer to −2, a smaller amount of dissolved Mn and Fe after cycling, and better battery performance, such as better high-temperature storage performance and high-temperature cycling performance.

TABLE 8

Thickness of and weight ratio of manganese to phosphorus in each layer of the cathode active material prepared in each of Examples 1 to 14 and Comparative Examples 1 to 3

| No. | Core | First coating layer | Second coating layer | Third coating layer | Thickness of the first coating layer (nm) | Thickness of the second coating layer (nm) | Thickness of the third coating layer (nm) | Mn element content (wt %) | Weight ratio of Mn to P |
|---|---|---|---|---|---|---|---|---|---|
| Comparative Example 1 | LiMn$_{0.80}$Fe$_{0.20}$PO$_4$ | 2% amorphous Li$_2$FeP$_2$O$_7$ | — | 2% carbon | 4 | — | 10 | 26.1 | 1.383 |
| Comparative Example 2 | LiMn$_{0.70}$Fe$_{0.295}$V$_{0.005}$PO$_4$ | — | — | 1% carbon | — | — | 5 | 24.3 | 1.241 |

TABLE 8-continued

Thickness of and weight ratio of manganese to phosphorus in each layer of the
cathode active material prepared in each of Examples 1 to 14 and Comparative Examples 1 to 3

| No. | Core | First coating layer | Second coating layer | Third coating layer | Thickness of the first coating layer (nm) | Thickness of the second coating layer (nm) | Thickness of the third coating layer (nm) | Mn element content (wt %) | Weight ratio of Mn to P |
|---|---|---|---|---|---|---|---|---|---|
| Comparative Example 3 | $Li_{0.999}Mn_{0.60}Fe_{0.393}V_{0.004}Co_{0.003}P_{0.999}S_{0.001}O_4$ | — | 3% crystalline $LiFePO_4$ | 1% carbon | — | 7.5 | 5 | 19.6 | 1.034 |
| Example 1 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon | 2 | 7.5 | 5 | 19.0 | 1.023 |
| Example 2 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 3% carbon | 2 | 7.5 | 15 | 18.3 | 1.023 |
| Example 3 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 4% carbon | 2 | 7.5 | 20 | 18.0 | 1.023 |
| Example 4 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 5% carbon | 2 | 7.5 | 25 | 17.9 | 1.023 |
| Example 5 | $Li_{0.997}Mn_{0.60}Fe_{0.393}V_{0.004}Co_{0.003}P_{0.997}S_{0.003}O_4$ | 2% $Li_2FeP_2O_7$ | 3% $LiFePO_4$ | 1% carbon | 4 | 7.5 | 5 | 18.7 | 1.011 |
| Example 6 | $Li_{0.997}Mn_{0.60}Fe_{0.393}V_{0.004}Co_{0.003}P_{0.997}S_{0.003}O_4$ | 3% $Li_2FeP_2O_7$ | 3% $LiFePO_4$ | 1% carbon | 6 | 7.5 | 5 | 18.3 | 0.999 |
| Example 7 | $Li_{0.997}Mn_{0.60}Fe_{0.393}V_{0.004}Co_{0.003}P_{0.997}S_{0.003}O_4$ | 5% $Li_2FeP_2O_7$ | 3% $LiFePO_4$ | 1% carbon | 10 | 7.5 | 5 | 17.6 | 0.975 |
| Example 8 | $Li_{0.997}Mn_{0.60}Fe_{0.393}V_{0.004}Co_{0.003}P_{0.997}S_{0.003}O_4$ | 1% $Li_2FeP_2O_7$ | 1% $LiFePO_4$ | 1% carbon | 2 | 2.5 | 5 | 19.8 | 1.043 |
| Example 9 | $Li_{0.997}Mn_{0.60}Fe_{0.393}V_{0.004}Co_{0.003}P_{0.997}S_{0.003}O_4$ | 1% $Li_2FeP_2O_7$ | 4% $LiFePO_4$ | 1% carbon | 2 | 10 | 5 | 18.7 | 1.014 |
| Example 10 | $Li_{0.997}Mn_{0.60}Fe_{0.393}V_{0.004}Co_{0.003}P_{0.997}S_{0.003}O_4$ | 1% $Li_2FeP_2O_7$ | 5% $LiFePO_4$ | 1% carbon | 2 | 12.5 | 5 | 18.4 | 1.004 |
| Example 11 | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon | 2 | 6.3 | 7.5 | 19.0 | 1.026 |
| Example 13 | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% carbon | 4 | 5 | 10 | 18.7 | 1.108 |
| Example 14 | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon | 5 | 8.8 | 12.5 | 17.8 | 1.166 |

It can be seen from Table 8 that, after LMFP (with a manganese content of 3500 and a phosphorus content of about 200%) is doped at manganese and phosphorus positions and coated with three layers, a content of manganese and a weight ratio of manganese to phosphorus in the cathode active material are significantly reduced. In addition, it can be seen from the comparison of Examples 1 to 14 with Comparative Examples 1, 2, and 3 and the Table 7 that the reduction of manganese and phosphorus in the cathode active material will lead to a decrease in dissolution of manganese and iron and an increase in performance of a secondary battery prepared from the cathode active material.

Examples 30 to 65

A cathode active material, a button battery, and a total battery were prepared by the same methods as in Example 6, but a composition of an electrolyte was changed. A specific composition of the electrolyte was shown in Table 9 below.

Further, the button battery or total battery in each of Examples 30 to 65 was subjected to a performance test in accordance with the above performance test method, and performance test data were shown in Table 10.

TABLE 9

Compositions of electrolytes

| Example | First lithium salt | Content W1 (%) | First additive | Content W2 (%) | W2/W1 ratio M | Second lithium salt | Content W3 (%) | (W2 + W3)/W1 ratio N |
|---|---|---|---|---|---|---|---|---|
| 30 | The same as in Example 6 | 5 | The same as in Example 6 | 0.20 | The same as in Example 6 | 0.4 |
| 31 | | 20 | | 0.05 | | 0.1 |
| 32 | | 18 | | 0.06 | | 0.11 |
| 33 | | 36 | | 0.03 | | 0.056 |
| 34 | | 0.1 | | 10.00 | | 20 |
| 35 | | 48 | | 0.02 | | 0.042 |
| 36 | | 0.05 | | 20.00 | | 40 |
| 37 | | 50 | | 0.02 | | 0.04 |

TABLE 9-continued

Compositions of electrolytes

| Example | First lithium salt | Content W1 (%) | First additive | Content W2 (%) | W2/W1 ratio M | Second lithium salt | Content W3 (%) | (W2 + W3)/W1 ratio N |
|---|---|---|---|---|---|---|---|---|
| 38 | The same as in Example 6 | | | 0.3 | 0.03 | The same as in Example 6 | | 0.13 |
| 39 | | | | 5 | 0.50 | | | 0.6 |
| 40 | | | | 1.5 | 0.10 | | | 0.25 |
| 41 | | | | 3 | 0.30 | | | 0.4 |
| 42 | | | | 0.01 | 0.00 | | | 0.1 |
| 43 | | | | 20 | 2.00 | | | 2.1 |
| 44 | | The same as in Example 6 | | | | | 0.3 | 1.3 |
| 45 | | | | | | | 5 | 0.6 |
| 46 | | | | | | | 1.5 | 0.25 |
| 47 | | | | | | | 8 | 0.9 |
| 48 | | | | | | | 0.01 | 0.1 |
| 49 | | | | | | | 20 | 2.1 |
| 50 | The same as in Example 6 | 20.00 | The same as in Example 6 | 0.02 | 0.001 | The same as in Example 6 | 1 | 0.051 |
| 51 | | 0.30 | | 0.90 | 3 | | 1 | 6.3 |
| 52 | | 20.00 | | 0.10 | 0.005 | | 0.1 | 0.01 |
| 53 | | 0.50 | | 0.50 | 1 | | 0.5 | 2 |
| 54 | | 2.46 | | 0.50 | 0.2 | | 1 | 0.61 |
| 55 | | 45.10 | | 14.00 | 0.31 | | 1 | 0.33 |
| 56 | | 0.60 | | 0.10 | 0.33 | | 1 | 1.83 |
| 57 | | 60.00 | | 10.00 | 0.33 | | 1 | 0.18 |
| 58 | Li(CF$_3$SO$_2$)(C$_2$F$_5$SO$_2$)N | | The same as in Example 6 | | | | | |
| 59 | LiN(CF$_3$SO$_2$)(C$_3$F$_7$SO$_2$) | | | | | | | |
| 60 | The same as in Example 6 | | Compound 2 | | | The same as in Example 6 | | |
| 61 | | | Compound 3 | | | | | |
| 62 | | | Compound 4 | | | | | |
| 63 | | | Compound 5 | | | | | |
| 64 | The same as in Example 6 | | | | | LiAsF$_6$ | The same as in Example 6 | |
| 65 | | | | | | LiDFP | | |

TABLE 10

Performance test data of the cathode active materials and the button batteries or total batteries in Examples 30 to 65 tested by the above performance test method

| | Powder properties of a cathode active material | | Performance of a battery | | |
|---|---|---|---|---|---|
| Example | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
| 30 | 68 | 35 | 156.5 | 3.2 | 1341 |
| 31 | 70 | 8 | 159.4 | 2.3 | 1682 |
| 32 | 71 | 8.5 | 158.7 | 2.2 | 1677 |
| 33 | 67 | 7 | 156.9 | 2.1 | 1507 |
| 34 | 64 | 78 | 154.1 | 7.4 | 1234 |
| 35 | 65 | 6 | 152.4 | 2.1 | 1165 |
| 36 | 63 | 105 | 150.2 | 11.8 | 1072 |
| 37 | 62 | 6 | 154.4 | 2.2 | 1014 |
| 38 | 71 | 32 | 156.4 | 7.3 | 1548 |
| 39 | 72 | 6 | 157.4 | 2.0 | 1640 |
| 40 | 73 | 8 | 158.5 | 2.2 | 1676 |
| 41 | 70 | 7 | 155.0 | 2.1 | 1558 |
| 42 | 67 | 158 | 147.1 | 14.5 | 1310 |
| 43 | 65 | 5 | 150.7 | 1.9 | 1139 |
| 44 | 70 | 13 | 156.6 | 6.1 | 1555 |
| 45 | 71 | 7 | 157.4 | 2.2 | 1518 |
| 46 | 74 | 8 | 158.6 | 2.3 | 1691 |
| 47 | 68 | 9 | 156.1 | 2.1 | 1423 |
| 48 | 67 | 12 | 151.5 | 5.1 | 1072 |
| 49 | 65 | 36 | 149.3 | 9.8 | 1112 |
| 50 | 68 | 124 | 152.7 | 13.0 | 1189 |

TABLE 10-continued

Performance test data of the cathode active materials and the button batteries or total batteries in Examples 30 to 65 tested by the above performance test method

| | Powder properties of a cathode active material | | Performance of a battery | | |
|---|---|---|---|---|---|
| Example | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
| 51 | 69 | 34 | 154.1 | 11.7 | 1152 |
| 52 | 70 | 65 | 155.2 | 9.9 | 1139 |
| 53 | 68 | 36 | 155.4 | 7.9 | 1139 |
| 54 | 70 | 24 | 155.2 | 7.1 | 1247 |
| 55 | 63 | 5 | 151.6 | 2.1 | 1123 |
| 56 | 64 | 145 | 154.6 | 32.4 | 1018 |
| 57 | 60 | 6 | 154.6 | 2.2 | 1165 |
| 58 | 71 | 12 | 157.2 | 2.6 | 1558 |
| 59 | 70 | 10 | 156.7 | 2.5 | 1564 |
| 60 | 74 | 15 | 156.1 | 3.4 | 1542 |
| 61 | 71 | 13 | 155.7 | 2.9 | 1569 |
| 62 | 72 | 11 | 156.2 | 2.5 | 1564 |
| 63 | 68 | 15 | 154.9 | 3.3 | 1521 |
| 64 | 74 | 12 | 157.1 | 3.3 | 1565 |
| 65 | 70 | 14 | 157.6 | 3.2 | 1535 |

The electrolyte in the total battery in each of Examples 1 to 29 was replaced by an electrolyte prepared as follows: organic solvents EC and EMC were thoroughly mixed according to a volume ratio of 3/7 to obtain a mixed solvent, 12.5 wt % (based on a weight of the mixed solvent of EC and EMC) of $LiPF_6$ was dissolved in the mixed solvent, and a resulting solution was thoroughly stirred to obtain the electrolyte. The electrolyte in the button battery was replaced by an electrolyte prepared as follows: 1 mol/L of $LiPF_6$ was dissolved in a mixed solvent of EC, DEC, and DMC in a volume ratio of 1:1:1 to obtain the electrolyte. The amount of dissolved Mn and Fe after cycling (ppm), the 0.1 C capacity of a button battery (mAh/g), the constant current ratio of 3 C charge (%), the number of cycles corresponding to a capacity retention of 80% (at 45° C., and the battery cell expansion during storage at 60 C (%) of the button battery or total battery prepared in each of Comparative Examples 4 to 32 were tested for according to the above methods, and test results were recorded in Table 11.

TABLE 11

| Comparative Example | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
|---|---|---|---|---|---|
| Comparative Example 4 | 70.3 | 7 | 157.2 | 4.2 | 1128 |
| Comparative Example 5 | 70.2 | 6 | 156.3 | 3.7 | 1253 |
| Comparative Example 6 | 70.1 | 5 | 155.4 | 3.4 | 1374 |
| Comparative Example 7 | 70.2 | 3 | 153.7 | 2.9 | 1406 |
| Comparative Example 8 | 70.1 | 5 | 156.7 | 3.1 | 1501 |
| Comparative Example 9 | 69.7 | 4 | 156.2 | 2.8 | 1576 |
| Comparative Example 10 | 68.4 | 3 | 155.8 | 2.5 | 1647 |
| Comparative Example 11 | 69.1 | 9 | 156.4 | 3.4 | 1058 |
| Comparative Example 12 | 73.4 | 6 | 157.6 | 2.9 | 1286 |
| Comparative Example 13 | 75.4 | 5 | 157.8 | 2.5 | 1486 |
| Comparative Example 14 | 72.4 | 6 | 157.3 | 3.5 | 1026 |
| Comparative Example 15 | 74.5 | 4 | 156.3 | 2.5 | 1136 |
| Comparative Example 16 | 75.3 | 5 | 156.6 | 3.5 | 1207 |
| Comparative Example 17 | 76.5 | 3 | 153.8 | 3.7 | 1308 |

TABLE 11-continued

| Comparative Example | Constant current ratio of 3 C charge (%) | Amount of dissolved Mn and Fe after cycling (ppm) | 0.1 C capacity of a button battery (mAh/g) | Battery cell expansion during 30 d storage at 60° C. (%) | Number of cycles corresponding to a capacity retention of 80% at 45° C. |
|---|---|---|---|---|---|
| Comparative Example 18 | 74.3 | 3 | 153.8 | 3.7 | 1109 |
| Comparative Example 19 | 73.1 | 5 | 154.2 | 3.8 | 1132 |
| Comparative Example 20 | 75.3 | 4 | 155.4 | 4.5 | 1258 |
| Comparative Example 21 | 76.1 | 4 | 154.3 | 4.7 | 1378 |
| Comparative Example 22 | 76.8 | 4 | 154.3 | 4.7 | 1328 |
| Comparative Example 23 | 75.4 | 4 | 153.9 | 3.3 | 1458 |
| Comparative Example 24 | 76.1 | 4 | 154.5 | 3.5 | 1327 |
| Comparative Example 25 | 72.1 | 2 | 152.1 | 2.7 | 1556 |
| Comparative Example 26 | 76.4 | 3 | 151.4 | 2.4 | 1645 |
| Comparative Example 27 | 76.3 | 3 | 152.1 | 2.5 | 1548 |
| Comparative Example 28 | 78.4 | 3 | 158.6 | 2.9 | 1538 |
| Comparative Example 29 | 56.4 | 8 | 152.3 | 4.8 | 1017 |
| Comparative Example 30 | 74.3 | 6 | 155.4 | 3.8 | 1126 |
| Comparative Example 31 | 54.7 | 9 | 154.9 | 6.4 | 986 |
| Comparative Example 32 | 68.4 | 7 | 155.6 | 4.5 | 1047 |

It can be seen from the comparison of Table 7 and Table 11 that the electrolyte composition of the present application can further improve the energy density and cycling performance of the secondary battery.

It should be noted that the present application is not limited to the above embodiments. The above embodiments are merely examples, and embodiments that have the same composition and effect as the technical idea within a scope of the technical solutions of the present application are included in the technical scope of the present application. In addition, within the scope of the subject of the present application, various variations that can be conceived by those skilled in the art to the embodiments and other embodiments constructed by combining some constituent elements of the embodiments are also included in the scope of the present application.

What is claimed is:

1. A secondary battery, comprising: a positive electrode sheet and a non-aqueous electrolyte, wherein
the positive electrode sheet comprises a cathode active material with a core-shell structure, and the cathode active material comprises a core and a shell covering the core;
the core has a chemical formula of $Li_{1+x}Mn_{1-y}A_yP_{1-z}R_zO_4$, wherein x is any value in a range of −0.100 to 0.100, y is any value in a range of 0.001 to 0.500, and z is any value in a range of 0.001 to 0.100; A is one or more selected from the group consisting of Zn, Al, Na, K, Mg, Mo, W, Ti, V, Zr, Fe, Ni, Co, Ga, Sn, Sb, Nb, and Ge; R is one or more selected from the group consisting of B, S1, N, and S;
the shell comprises a first coating layer covering the core, a second coating layer covering the first coating layer, and a third coating layer covering the second coating layer,
wherein the first coating layer comprises a crystalline pyrophosphate $Li_aMP_2O_7$ and/or a crystalline pyrophosphate $M_b(P_2O_7)_c$, wherein $0 \leq a \leq 2$, $1 \leq b \leq 4$, and $1 \leq c \leq 6$; values of a, b, and c meet the following condition: keeping the crystalline pyrophosphate $Li_aMP_2O_7$ or $M_b(P_2O_7)_c$ electrically neutral; and M in each of the crystalline pyrophosphates $Li_aMP_2O_7$ and $M_b(P_2O_7)_c$ is independently one or more selected from the group consisting of Fe, Ni, Mg, Co, Cu, Zn, Ti, Ag, Zr, Nb, and Al;
the second coating layer comprises a crystalline phosphate $XPO_4$, wherein X is one or more selected from the group consisting of Li, Fe, Ni, Mg, Co, Cu, Zn, Ti, Ag, Zr, Nb, and Al; and
the third coating layer is carbon; and
the non-aqueous electrolyte comprises a first lithium salt and a first additive,
wherein the first lithium salt comprises one or more selected from the group consisting of $LiN(C_mF_{2m+1}SO_2)(C_nF_{2n+1}SO_2)$ and $Li(FSO_2)_2N$, wherein m and n each are a positive integer; and
the first additive comprises one or more selected from the group consisting of compounds shown in Formula 1

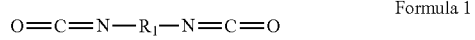

Formula 1 wherein $R_1$ is any one selected from the group consisting of $C_2$-$C_{10}$ alkylene, $C_2$-$C_{10}$ heteroalkylene, $C_6$-$C_{15}$ arylene, $C_2$-$C_{15}$ heteroarylene, $C_3$-$C_{15}$ alicyclylene, and $C_3$-$C_{18}$ heteroalicyclylene that each are or are not substituted by one or more $R_a$ groups;

$R_a$ comprises one or more selected from the group consisting of a halogen atom, —CN, —NCO, —OH, —COOH, —SOOH, —COOR$_b$, $C_2$-$C_{10}$ alkyl, $C_2$-$C_{10}$ alkenyl, $C_2$-$C_{10}$ alkynyl, and $C_2$-$C_{10}$ oxaalkyl; and $R_b$ is any $C_1$-$C_{10}$ alkyl.

2. The secondary battery according to claim 1, wherein
$R_1$ is any one selected from the group consisting of $C_2$-$C_{10}$ alkylene, $C_2$-$C_{10}$ oxaalkylene, $C_2$-$C_{10}$ azaalkylene, phenylene, naphthylene, anthracenylene, cyclobutylene, cyclopentylene, cyclohexylene, biphenylene, and methylenediphenylene that each are or are not substituted by one or more $R_a$ groups; and/or $R_a$ comprises one or more selected from the group consisting of a halogen atom, —CN, and $C_2$-$C_3$ alkyl; and/or there is 0, 1, 2, 3, or 4 $R_a$ groups in a compound shown in Formula 1.

3. The secondary battery according to claim 1, wherein the first additive comprises at least one selected from the group consisting of the following compounds:

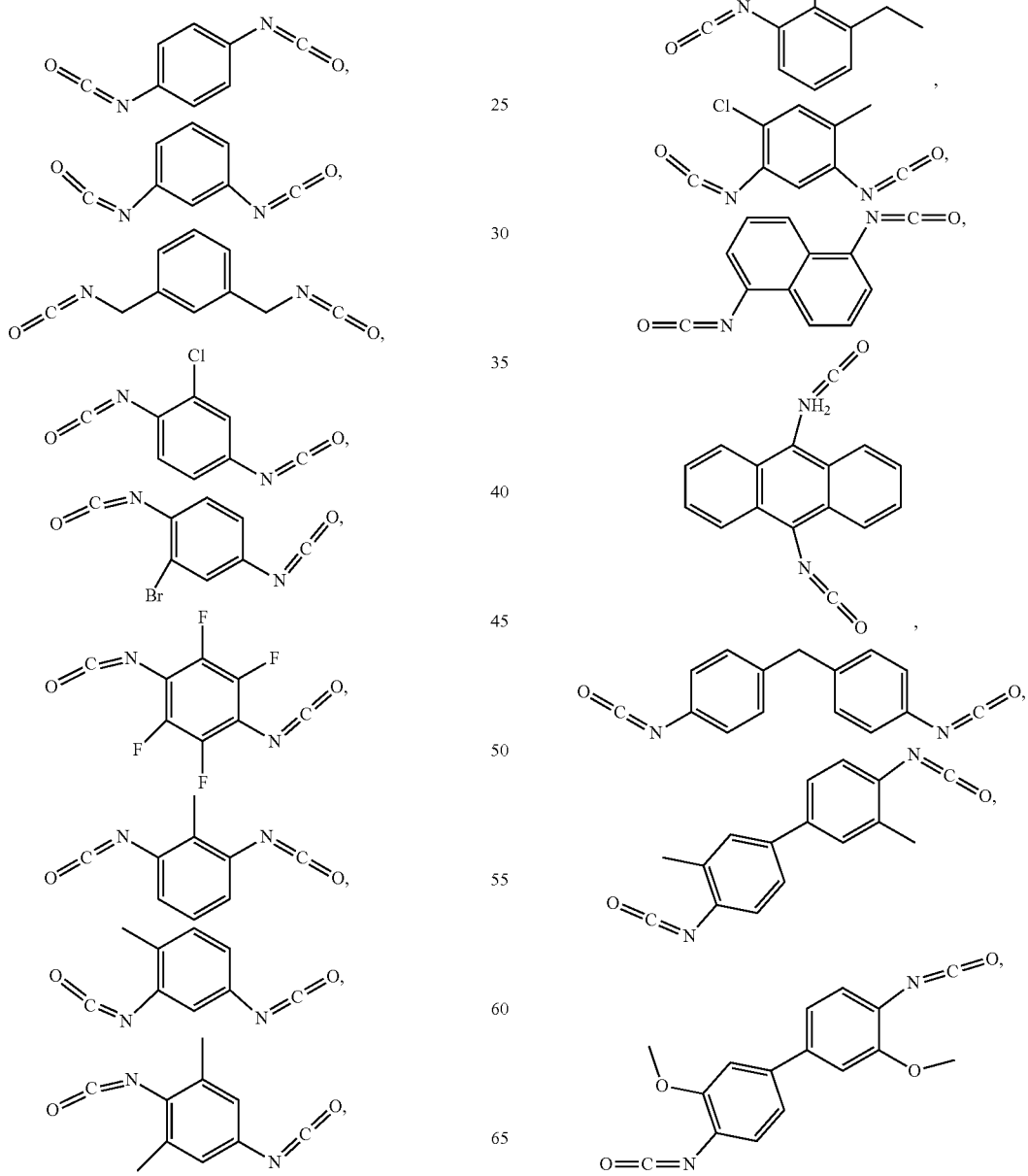

-continued

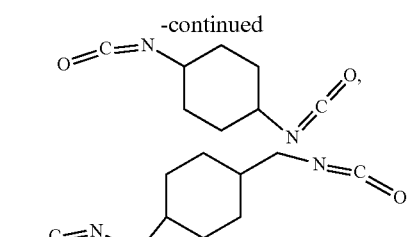

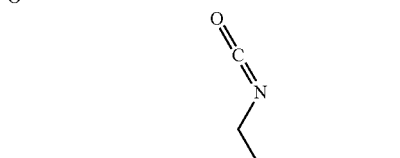

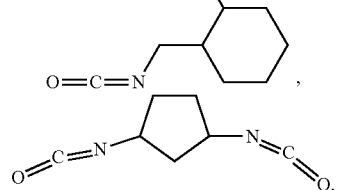

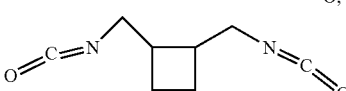

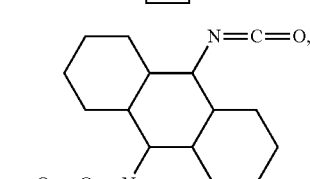

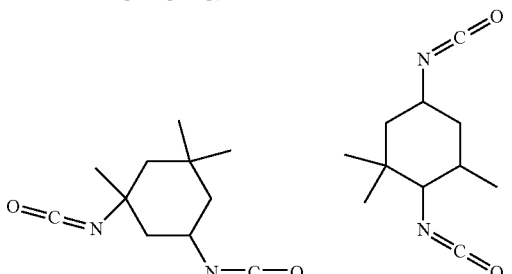

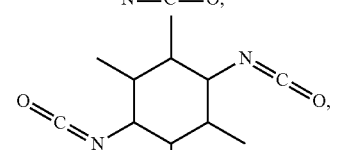

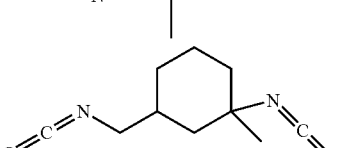

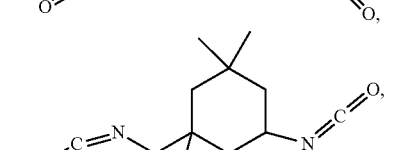

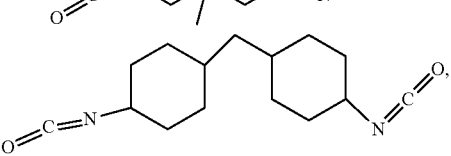

-continued

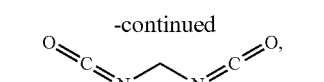

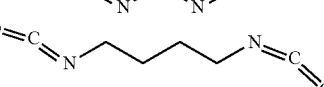

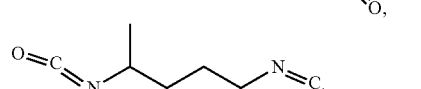, and

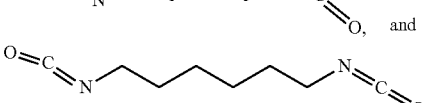

4. The secondary battery according to claim 1, wherein m and n each independently selected from the group consisting of 0, 1, 2, and 3.

5. The secondary battery according to claim 1, wherein based on a total weight of the non-aqueous electrolyte,
a content of the first lithium salt is set as W1 wt %, and W1 is 0.1 to 48; and/or,
a content of the first additive is set as W2 wt %, and W2 is 0.01 to 20.

6. The secondary battery according to claim 5, wherein based on a weight of the core, a coating amount of the first coating layer is set as C1 wt %, and C1 is greater than 0 and less than or equal to 6; and/or
based on the weight of the core, a coating amount of the second coating layer is set as C2 wt %, and C2 is greater than 0 and less than or equal to 6; and/or
based on the weight of the core, a coating amount of the third coating layer is set as C3 wt %, and C3 is greater than 0 and less than or equal to 6; and
a ratio of (W1+W2)/(C1+C2+C3) is defined as Q, and Q is 0.1 to 10.

7. The secondary battery according to claim 1, wherein the non-aqueous electrolyte further comprises a second lithium salt, and the second lithium salt comprises one or more selected from the group consisting of lithium difluorophosphate (LiDFP), lithium difluoro(bisoxalato)phosphate (LiDFBOP), lithium difluoro(oxalato)borate (LI-ODFB), lithium bis(oxalato)borate (LiBOB), $LiPF_6$, $LiBF_4$, and $LiAsF_6$.

8. The secondary battery according to claim 7, wherein based on a total weight of the non-aqueous electrolyte, a content of the second lithium salt is set as W3 wt %, and W3 is 0.01 to 20.

9. The secondary battery according to claim 8, wherein (W2+W3)/W1 is defined as N, and N is 0.01 to 2.

10. The secondary battery according to claim 1, wherein the non-aqueous electrolyte further comprises a second additive, and the second additive comprises one or more selected from the group consisting of an unsaturated bond-containing cyclic carbonate compound, a halogen-substituted saturated cyclic carbonate compound, a sulfate compound, a sulfite compound, a sultone compound, a disulfonic acid compound, a nitrile compound, an aromatic compound, an isocyanate compound, a phosphonitrile compound, a cyclic anhydride compound, a phosphite compound, a phosphate compound, and a borate compound.

11. The secondary battery according to claim 1, wherein the non-aqueous electrolyte further comprises an organic solvent; and
the organic solvent comprises one or more selected from the group consisting of a cyclic carbonate compound, a chain carbonate compound, and a carboxylate compound.

12. The secondary battery according to claim 1, wherein based on a weight of the core, a coating amount of the first coating layer is set as C1 wt %, and C1 is greater than 0 and less than or equal to 6; and/or based on the weight of the core, a coating amount of the second coating layer is set as C2 wt %, and C2 is greater than 0 and less than or equal to 6; and/or based on the weight of the core, a coating amount of the third coating layer is set as C3 wt %, and C3 is greater than 0 and less than or equal to 6.

13. The secondary battery according to claim 1, wherein for the crystalline pyrophosphate in the first coating layer, an interplanar crystal spacing is in a range of 0.293 nm to 0.470 nm and an angle of a crystal orientation (111) is in a range of 18.00° to 32.00°; and for the crystalline phosphate in the second coating layer, an interplanar crystal spacing is in a range of 0.244 nm to 0.425 nm and an angle of a crystal orientation (111) is in a range of 20.00° to 37.00°.

14. The secondary battery according to claim 1, wherein in the core, a ratio of y to 1−y is 1:10 to 1:1.

15. The secondary battery according to claim 1, wherein in the core, a ratio of z to 1−z is 1:9 to 1:999.

16. The secondary battery according to claim 1, wherein the carbon of the third coating layer is a mixture of SP2-hybridized carbon and SP3-hybridized carbon.

17. The secondary battery according to claim 1, wherein the first coating layer has a thickness of 1 nm to 10 nm; and/or the second coating layer has a thickness of 2 nm to 15 nm; and/or the third coating layer has a thickness of 2 nm to 25 nm.

18. The secondary battery according to claim 1, wherein based on a weight of the cathode active material, a manganese content is in a range of 10 wt % to 35 wt %;

a phosphorus content is in a range of 12 wt % to 25 wt %.

19. The secondary battery according to claim 1, wherein a lattice change rate of the cathode active material with the core-shell structure before and after complete lithium deintercalation is 4% or less; and/or a Li/Mn antisite defect concentration of the cathode active material with the core-shell structure is 4% or less; and/or a compacted density of the cathode active material with the core-shell structure at 3 T is 2.2 $g/cm^3$ or more; and/or a surface oxygen valence state of the cathode active material with a core-shell structure is −1.90 or less.

20. A battery module comprising the secondary battery according to claim 1.

21. A battery pack comprising the battery module according to claim 20.

22. An electric device comprising at least one selected from the group consisting of the secondary battery according to claim 1.

* * * * *